United States Patent (10) Patent No.: US 12,160,182 B2
Tsukada (45) Date of Patent: Dec. 3, 2024

(54) POWER CONVERSION DEVICE, METHOD OF CONTROLLING POWER CONVERSION DEVICE, AND STORAGE MEDIUM

(71) Applicant: HONDA MOTOR CO., LTD., Tokyo (JP)

(72) Inventor: Yoshinari Tsukada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 222 days.

(21) Appl. No.: 17/824,945

(22) Filed: May 26, 2022

(65) Prior Publication Data

US 2022/0393612 A1    Dec. 8, 2022

(30) Foreign Application Priority Data

Jun. 8, 2021  (JP) ................................ 2021-095727

(51) Int. Cl.
| | |
|---|---|
| *H02M 3/335* | (2006.01) |
| *B60L 58/10* | (2019.01) |
| *H02M 3/158* | (2006.01) |
| *H02M 7/539* | (2006.01) |
| *H02P 27/06* | (2006.01) |

(52) U.S. Cl.
CPC ............ *H02M 7/539* (2013.01); *B60L 58/10* (2019.02); *H02M 3/1582* (2013.01); *H02M 3/33573* (2021.05); *H02M 3/33584* (2013.01); *B60L 2210/10* (2013.01); *H02P 27/06* (2013.01)

(58) Field of Classification Search
CPC ............ H02M 7/539; H02M 3/33573; H02M 3/1582; H02M 3/33584; H02P 27/06; B60L 58/10; B60L 2210/10
See application file for complete search history.

(56) References Cited

U.S. PATENT DOCUMENTS

| | | | |
|---|---|---|---|
| 2011/0193509 A1* | 8/2011 | Ooyama | ................ H02M 1/12 363/40 |
| 2014/0268966 A1 | 9/2014 | Kamata | |
| 2015/0381076 A1 | 12/2015 | Sadki et al. | |

(Continued)

FOREIGN PATENT DOCUMENTS

| | | |
|---|---|---|
| CN | 105191117 | 12/2015 |
| CN | 110249500 | 9/2019 |

(Continued)

OTHER PUBLICATIONS

Japanese Notice of Allowance for Japanese Patent Application No. 2021-095727 mailed Mar. 22, 2023.

(Continued)

*Primary Examiner* — Adolf D Berhane
(74) *Attorney, Agent, or Firm* — Amin, Turocy & Watson, LLP

(57) ABSTRACT

A power conversion device includes a first converter configured to convert at least first battery power output by a first battery into first output power of a first voltage waveform based on an output waveform profile that has been input or set and output the first output power and a first generator configured to generate and output second output power based on the first battery power. Third output power of an alternating current (AC) control waveform generated by adding the first output power to the second output power is supplied to a load.

9 Claims, 25 Drawing Sheets

(56) References Cited

U.S. PATENT DOCUMENTS

| | | | |
|---|---|---|---|
| 2019/0363569 A1 | 11/2019 | Toyoda | |
| 2022/0393617 A1* | 12/2022 | Tsukada | B60L 55/00 |
| 2023/0120921 A1* | 4/2023 | Tsukada | H02M 7/539 |
| | | | 307/91 |

FOREIGN PATENT DOCUMENTS

| | | | |
|---|---|---|---|
| JP | 11146657 A * | 5/1999 | |
| JP | 2003-111412 | 4/2003 | |
| JP | 2004-274827 | 9/2004 | |
| JP | 2009-017660 | 1/2009 | |
| JP | 2014-180127 | 9/2014 | |
| JP | 2015-233370 | 12/2015 | |
| JP | 2018-068015 | 4/2018 | |
| WO | 2007/105613 | 9/2007 | |
| WO | 2019/004015 | 1/2019 | |
| WO | 2019/116785 | 6/2019 | |

OTHER PUBLICATIONS

Chinese Office Action for Chinese Patent Application No. 202210595731.X mailed Aug. 31, 2024.

\* cited by examiner

| CONTROL | S11 | S12 | S13 | S14 | Vout |
|---------|-----|-----|-----|-----|------|
| C1' | ON | OFF | OFF | OFF | 0<E1 |
| C2' | ↑ | ↑ | ON | ON | E1=E2 (PARALLEL CONNECTION) |
| C3' | OFF | ↑ (D) | ↑ | OFF | E1+E2 (SERIES CONNECTION) |

| CONTROL | S11 | S12 | S13 | S14 | S15 | S16 | S17 | S18 | Vout | PATH |
|---|---|---|---|---|---|---|---|---|---|---|
| C1 | OFF (D) | OFF | OFF | OFF | OFF (D) | OFF | OFF | OFF | 0<E1 | P1 |
| C2 | ↑ | ↑ | ON | ↑ (D) | ↑ | ↑ | ↑ | ↑ | E1=E2 (PARALLEL CONNECTION) | P2 |
| C3 | OFF | ON | ↑ | ↑ (OFF) | ↑ | ↑ | ↑ | ↑ | E1+E2 (SERIES CONNECTION) | P3 |
| C4 | ↑ | ↑ | ↑ | ↑ | ↑ | ↑ | ON | ↑ (D) | E2=E3 (PARALLEL CONNECTION) | P4 |
| C5 | ↑ | ↑ | ↑ | ↑ | OFF | ON | ↑ | ↑ (OFF) | E1+E2+E3 (SERIES CONNECTION) | P5 |

(b)

| CONTROL | S11 | S12 | S13 | S14 | S15 | S16 | S17 | S18 | Vout | PATH |
|---|---|---|---|---|---|---|---|---|---|---|
| C1' | ON | OFF | OFF | OFF | ON | OFF | OFF | OFF | 0<E1 | P1' |
| C2' | ↑ | ↑ | ON | ON | ↑ | ↑ | ↑ | ↑ | E1=E2 (PARALLEL CONNECTION) | P2' |
| C3' | OFF | ↑ (D) | ↑ | OFF | ↑ | ↑ | ↑ | ↑ | E1+E2 (SERIES CONNECTION) | P3' |
| C4' | ↑ | ↑ | ↑ | ↑ | ↑ | ↑ | ON | ON | E2=E3 (PARALLEL CONNECTION) | P4' |
| C5' | ↑ | ↑ | ↑ | ↑ | OFF | ↑ (D) | ↑ | OFF | E1+E2+E3 (SERIES CONNECTION) | P5' |

| CONTROL | CONVERTER 300 | S21R | S21 | CONVERTER 310-1 | | S22 | CONVERTER 310-2 | | Vout |
|---|---|---|---|---|---|---|---|---|---|
| | | | | NOP | OP | | NOP | OP | |
| C1 | OP (UP) | OFF | OFF (D) | ↑ | | OFF (D) | ↑ | | 0 < E |
| C2 | OP (Max) | ↑ | ↑ | ↑ | | ↑ | ↑ | | E2 → E1+E2 (SERIES CONNECTION) |
| | OP (0V) | ↑ (D) | ↑ (OFF) | | OP | ↑ | ↑ | | E1+E2 (SERIES CONNECTION) |
| | OP (UP) | ↑ (OFF) | OFF (D) | ↑ | | ↑ | ↑ | | E1+E2 |
| C3 | OP (Max) | ↑ | ↑ | ↑ | | ↑ | ↑ | | E1+E2+E3 (SERIES CONNECTION) |
| | OP (0V) | ↑ (D) | ↑ (OFF) | ↑ | | OFF | | OP | E1+E2+E3 (SERIES CONNECTION) |
| | OP (UP) | ↑ (OFF) | OFF (D) | ↑ | | ↑ | ↑ | | |

(b)

| CONTROL | CONVERTER 300 | S21R | S21 | CONVERTER 310-1 | | S22 | CONVERTER 310-2 | | Vout |
|---|---|---|---|---|---|---|---|---|---|
| | | | | NOP | OP | | NOP | OP | |
| C1' | OP (UP) | OFF | ON | ↑ | | OFF | ↑ | | 0 < E |
| C2' | OP (Max) | ↑ | ↑ | ↑ | | ON | ↑ | | E2 → E1+E2 (SERIES CONNECTION) |
| | OP (0V) | ON | OFF | | OP | ↑ | ↑ | | E1+E2 (SERIES CONNECTION) |
| | OP (UP) | ↑ | ↑ | ↑ | | ↑ | ↑ | | E1+E2 |
| C3' | OP (Max) | ON | ↑ | ↑ | | ↑ | ↑ | | E1+E2+E3 (SERIES CONNECTION) |
| | OP (0V) | OFF | ↑ | ↑ | | OFF | | OP | E1+E2+E3 (SERIES CONNECTION) |
| | OP (UP) | | ↑ | ↑ | | ↑ | ↑ | | |

POWER CONVERSION DEVICE, METHOD OF CONTROLLING POWER CONVERSION DEVICE, AND STORAGE MEDIUM

CROSS-REFERENCE TO RELATED APPLICATION

Priority is claimed on Japanese Patent Application No. 2021-095727, filed Jun. 8, 2021, the content of which is incorporated herein by reference.

BACKGROUND OF THE INVENTION

Field of the Invention

The present invention relates to a power conversion device, a method of controlling the power conversion device, and a storage medium.

Description of Related Art

In recent years, for example, development of electric vehicles such as a hybrid electric vehicle (HEV) and a plug-in hybrid electric vehicle (PHEV), each of which performs traveling using an electric motor driven with at least power supplied by a battery (a secondary battery), has progressed. In these electric vehicles, direct current (DC) power stored in the battery is converted into alternating current (AC) power for driving the electric motor.

In this regard, for example, PCT International Publication No. WO 2019/004015 and PCT International Publication No. WO 2019/116785 disclose technologies for power conversion devices that convert DC power into AC power. In the power conversion devices disclosed in PCT International Publication No. WO 2019/004015 and PCT International Publication No. WO 2019/116785, DC power is converted into AC power by performing a switching control process for the ON or OFF time of a battery, which is a power source, using an inverter. Inverters have a simple configuration and have become the most popular in recent years as power conversion devices that adjust AC power and frequency.

Although the electric vehicle differs according to specifications of a vehicle or an electric motor, the electric vehicle is equipped with a battery that outputs a high voltage such as, for example, several hundred volts [V], and an inverter boosts the voltage of the battery and supplies the boosted voltage to the electric motor. Thus, it is necessary to use a high withstand voltage component that can withstand high voltage (for example, the voltage increased by a factor of 2) for a component (an electric circuit) such as a switching element constituting the inverter. However, because ON resistance increases as the withstand voltage of an electric component increases, the loss generally increases. Thus, the efficiency of power conversion is reduced in the inverter for use in the electric vehicle. Further, in a power conversion process of the inverter, harmonics due to switching control are generated, an AC waveform is distorted, and characteristics such as noise, torque ripple, and iron loss are affected.

Incidentally, in normal traveling of an electric vehicle, a high voltage is not required all the time, but a voltage lower than the battery voltage is rather often required. That is, in the operation of the inverter during normal traveling of the electric vehicle, lowering the voltage of the battery is more frequent than raising the voltage of the battery. However, the inverter used in the electric vehicle is required to be configured according to the case where the voltage of the battery is boosted to guarantee the case where the electric vehicle travels at a maximum traveling capacity. That is, because the conventional inverter for use in an electric vehicle has excessively high-performance characteristics, the characteristics do not match the traveling characteristics of the electric vehicle.

As described above, the inverter conventionally used for an electric vehicle as a power conversion device does not necessarily have a preferred configuration capable of performing power conversion suitable for the traveling characteristics of the electric vehicle.

SUMMARY OF THE INVENTION

The present invention has been made on the basis of the recognition of the above-described problems and an objective of the present invention is to provide a power conversion device, a method of controlling the power conversion device, and a storage medium capable of preferably performing power conversion of a battery suitable for traveling characteristics of an electric vehicle.

A power conversion device, a method of controlling the power conversion device, and a storage medium according to the present invention adopt the following configurations.

(1): According to an aspect of the present invention, there is provided a power conversion device including: a first converter configured to convert at least first battery power output by a first battery into first output power of a first voltage waveform based on an output waveform profile that has been input or set and output the first output power; and a first generator configured to generate and output second output power based on the first battery power, wherein third output power of an alternating current (AC) control waveform generated by adding the first output power to the second output power is supplied to a load.

(2): In the above-described aspect (1), a voltage waveform of the second output power is a rectangular waveform.

(3): In the above-described aspect (2), the first voltage waveform is a voltage waveform obtained by subtracting the rectangular waveform from the control waveform.

(4): In the above-described aspect (3), the first generator includes a switching unit configured to generate half-waves of sinusoidal waves by controlling a process of adding the first output power to the second output power; and an inversion unit configured to supply the third output power obtained by inverting the half-waves to the load.

(5): In the above-described aspect (4), the switching unit is a first switching element configured to be set in a conductive state in which the second output power is able to be supplied to the load and to be set in a non-conductive state in which the first output power is unable to be supplied from the first converter to the first generator.

(6): In the above-described aspect (5), the power conversion device further includes a second generator connected in parallel to the first converter and configured to generate and output fourth output power of a rectangular waveform based on the first battery power, wherein the switching unit further includes a second switching element configured to be set in a conductive state in which the fourth output power is able to be supplied to the load and to be set in a non-conductive state in which the first output power is unable to be supplied from the first converter to the second generator, and wherein the third output power generated by adding the first output power and the second output power to the fourth output power is supplied to the load.

(7): In the above-described aspect (4), the switching unit is a third switching element configured to switch a connection between the first generator and the first converter to a series connection or a parallel connection.

(8): In the above-described aspect (7), the power conversion device further includes a third generator configured to generate and output fifth output power of a rectangular waveform based on second battery power output by a second battery, wherein the switching unit further includes a fourth switching element configured to switch a connection between a series connection between the first generator, and the first converter and the third generator to a series connection or a parallel connection, and wherein the third output power generated by adding the first output power and the second output power to the fifth output power is supplied to the load.

(9): In the above-described aspect (4), the switching unit includes: a fifth switching element configured to be set in a conductive state in which the first output power is able to be supplied to the load and to be set in a non-conductive state in which the second output power is unable to be supplied to the first converter; and a sixth switching element configured to cause the first generator and the first converter to be connected or disconnected.

(10): In the above-described aspect (9), the power conversion device further includes a fourth generator connected in parallel to the first converter and the first generator and configured to generate and output sixth output power based on the first battery power, wherein the switching unit further includes a seventh switching element configured to be set in a conductive state in which the sixth output power is able to be supplied to the load and to be set in a non-conductive state in which the first output power and the second output power are unable to be supplied to the fourth generator, and wherein the third output power generated by adding the first output power and the second output power to the sixth output power is supplied to the load.

(11): According to an aspect of the present invention, there is provided a method of controlling a power conversion device including a first converter configured to convert at least first battery power output by a first battery into first output power of a first voltage waveform based on an output waveform profile that has been input or set and output the first output power and a first generator configured to generate and output second output power based on the first battery power, the method including: performing, by a computer, a control process so that third output power of an AC control waveform generated by adding the first output power to the second output power is supplied to a load.

(12): According to an aspect of the present invention, there is provided a non-transitory computer-readable storage medium storing a program for controlling a power conversion device including a first converter configured to convert at least first battery power output by a first battery into first output power of a first voltage waveform based on an output waveform profile that has been input or set and output the first output power and a first generator configured to generate and output second output power based on the first battery power, the program causing a computer to: perform a control process so that third output power of an AC control waveform generated by adding the first output power to the second output power is supplied to a load.

According to the above-described aspects (1) to (12), it is possible to preferably perform power conversion of a battery suitable for traveling characteristics of an electric vehicle.

BRIEF DESCRIPTION OF THE DRAWINGS

FIG. 22 is a diagram showing an example in which the control device provided in the vehicle controls the power conversion device.

FIG. 25 is a diagram showing an example in which a control device provided in a vehicle controls the power conversion device.

DETAILED DESCRIPTION OF THE INVENTION

Hereinafter, embodiments of a power conversion device, a method of controlling the power conversion device, and a storage medium of the present invention will be described with reference to the drawings. As used throughout this disclosure, the singular forms "a," "an," and "the" include plural reference unless the context clearly dictates otherwise.

[Configuration of Vehicle]

Figure 1:
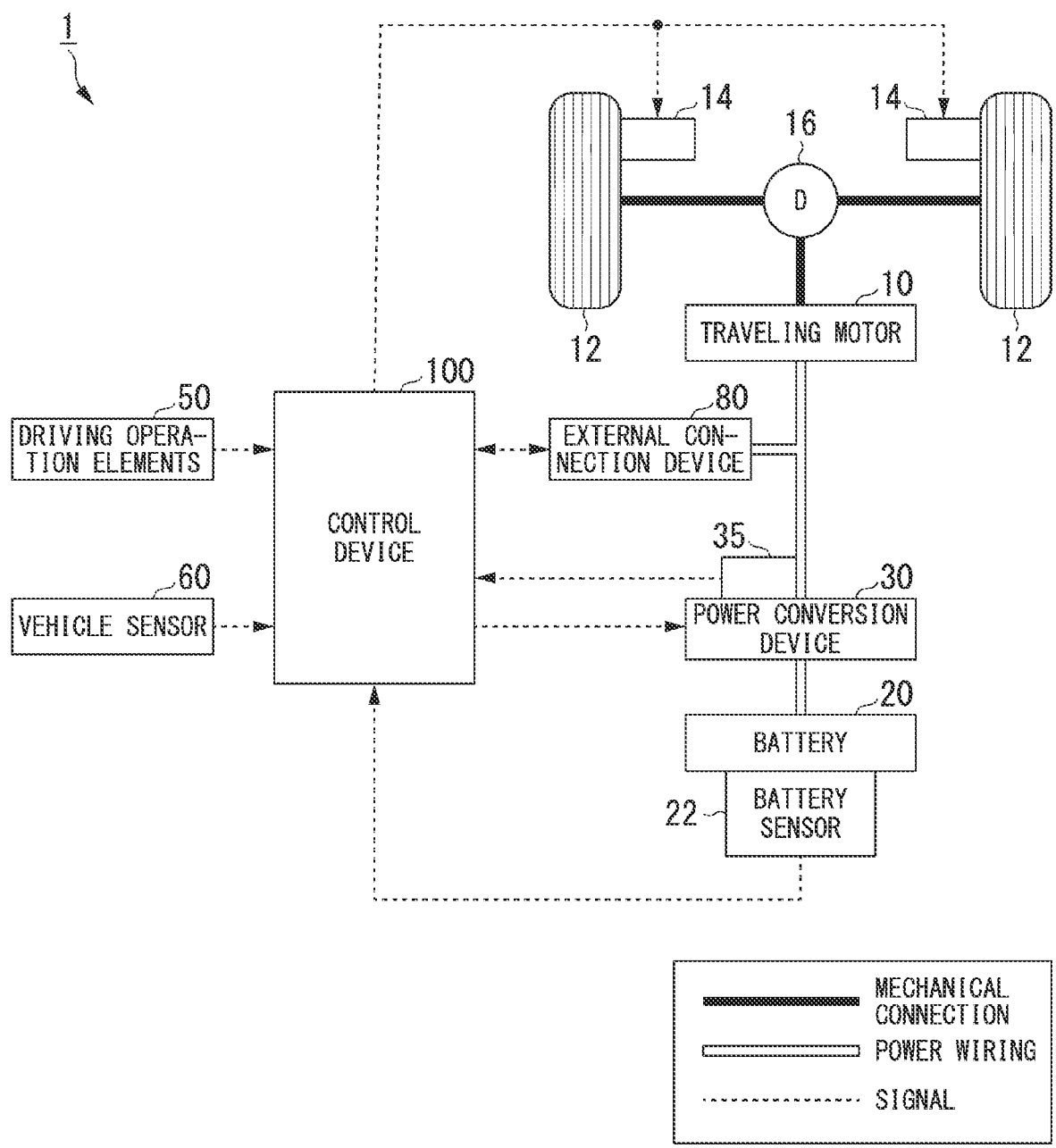
FIG. 1 is a diagram showing an example of a configuration of a vehicle in which a power conversion device according to an embodiment is adopted.

FIG. 1 is a diagram showing an example of a configuration of a vehicle in which a power conversion device according to an embodiment is adopted. A vehicle 1 is an electric vehicle (EV) (hereinafter simply referred to as a "vehicle") that travels using an electric motor driven with power supplied from a traveling battery (a secondary battery). Vehicles to which the present invention is applied include, for example, general vehicles such as four-wheeled vehicles, saddle-riding type two-wheeled vehicles, three-wheeled vehicles (including two front wheel and one rear wheel vehicles in addition to one front wheel and two rear wheel vehicles), and a vehicle that travels using an electric motor driven by power supplied from a traveling battery such as an assisted bicycle. The vehicle 1 may be, for example, a hybrid electric vehicle (HEV) that travels by further combining power supplied according to an operation of an internal combustion engine that uses fuel as an energy source, such as a diesel engine or a gasoline engine.

The vehicle 1 includes, for example, a traveling motor 10, drive wheels 12, a brake device 14, a speed reducer 16, a battery 20, a battery sensor 22, a power conversion device 30, a power sensor 35, driving operation elements 50, a vehicle sensor 60, an external connection device 80, and a control device 100.

The traveling motor 10 is a rotating electric device for traveling of the vehicle 1. The traveling motor 10 is, for example, a three-phase alternating current (AC) electric motor. A rotor of the traveling motor 10 is connected to the speed reducer 16. The traveling motor 10 is driven (rotated) with power supplied from the battery 20 via the power conversion device 30. The traveling motor 10 transfers its own rotational power to the speed reducer 16. The traveling motor 10 may operate as a regenerative brake using the kinetic energy of the vehicle 1 during deceleration to generate electricity. The traveling motor 10 is an example of a "load" in the claims.

The brake device 14 arranged on the drive wheel 12 includes, for example, a brake caliper, a cylinder that transfers hydraulic pressure to the brake caliper, and an electric motor that causes a cylinder to generate the hydraulic pressure. The brake device 14 may include a mechanism for transferring the hydraulic pressure generated by an operation of a user (a driver) of the vehicle 1 on a brake pedal (not shown) to the cylinder via a master cylinder as a backup. The brake device 14 is not limited to the above-described configuration and may be an electronically controlled hydraulic brake device that transfers the hydraulic pressure of the master cylinder to the cylinder.

The speed reducer 16 is, for example, a differential gear. The speed reducer 16 causes a driving force of a shaft to which the traveling motor 10 is connected, i.e., rotational power of the traveling motor 10, to be transferred to an axle to which the drive wheel 12 is connected. The speed reducer 16 may include, for example, a so-called transmission mechanism in which a plurality of gears or shafts are combined to change the rotational speed of the traveling motor 10 in accordance with a gear ratio and cause the rotational speed to be transferred to the axle. The speed reducer 16 may also include, for example, a clutch mechanism that directly connects or separates the rotational power of the traveling motor 10 to or from the axle.

The battery 20 is, for example, a battery including a secondary battery capable of iteratively being charged and discharged as a power storage such as a lithium-ion battery. The battery 20 may have a configuration that can be easily attached to and detached from the vehicle 1, such as a cassette type battery pack, or may have a stationary configuration that is not easily attached to and detached from the vehicle 1. The secondary battery provided in the battery 20 is, for example, a lithium-ion battery. Although, for example, a lead storage battery, a nickel-hydrogen battery, a sodium ion battery, or the like, a capacitor such as an electric double layer capacitor, or a composite battery in which a secondary battery and a capacitor are combined can be considered for the secondary battery provided in the battery 20, the secondary battery may have any configuration. The battery 20 stores (is charged with) power introduced from an external charger (not shown) of the vehicle 1 and is discharged to supply the stored power so that the vehicle 1 is allowed to travel. The battery 20 stores (is charged with) the power generated by the traveling motor 10 operated as a regenerative brake supplied via the power conversion device 30 and is discharged to supply the stored power for traveling (for example, accelerating) of the vehicle 1. The battery 20 is an example of a "first battery" in the claims and the power supplied when the battery 20 is discharged is an example of "first battery power" in the claims.

The battery sensor 22 is connected to the battery 20. The battery sensor 22 detects physical quantities such as a voltage, a current, and a temperature of the battery 20. The battery sensor 22 includes, for example, a voltage sensor, a current sensor, and a temperature sensor. The battery sensor 22 detects the voltage of the battery 20 using the voltage sensor, detects the current of the battery 20 using the current sensor, and detects the temperature of the battery 20 using the temperature sensor. The battery sensor 22 outputs information (hereinafter referred to as "battery information") such as the voltage value, the current value, and the temperature of the battery 20 that have been detected to the control device 100.

The power conversion device 30 boosts or lowers a voltage of DC power supplied (discharged) from the battery 20 to a voltage when power is supplied to the traveling motor 10, further performs the conversion into power of an AC (AC power) for driving the traveling motor 10, and outputs the AC power to the traveling motor 10. The power conversion device 30 converts the AC power generated by the traveling motor 10 operating as a regenerative brake into DC power, further boosts or lowers a voltage to a voltage when the battery 20 is charged, outputs the DC power to the battery 20, and causes the battery 20 to store the DC power. That is, for example, the power conversion device 30 implements a function similar to that of a combination of a DC-DC converter and an AC-DC converter or a function similar to that of an inverter. For example, the power conversion device 30 converts the DC power supplied (discharged) from the battery 20 into AC power for operating household electric appliances at the time of emergency or the like or for supplying power to a power system in an electric power selling process or the like and outputs the AC power to the external connection device 80. At this time, the power conversion device 30 can boost or lower the voltage according to the output destination of the power and output the boosted or lowered voltage.

[Configuration of Power Conversion Device Provided in Vehicle]

Figure 2:
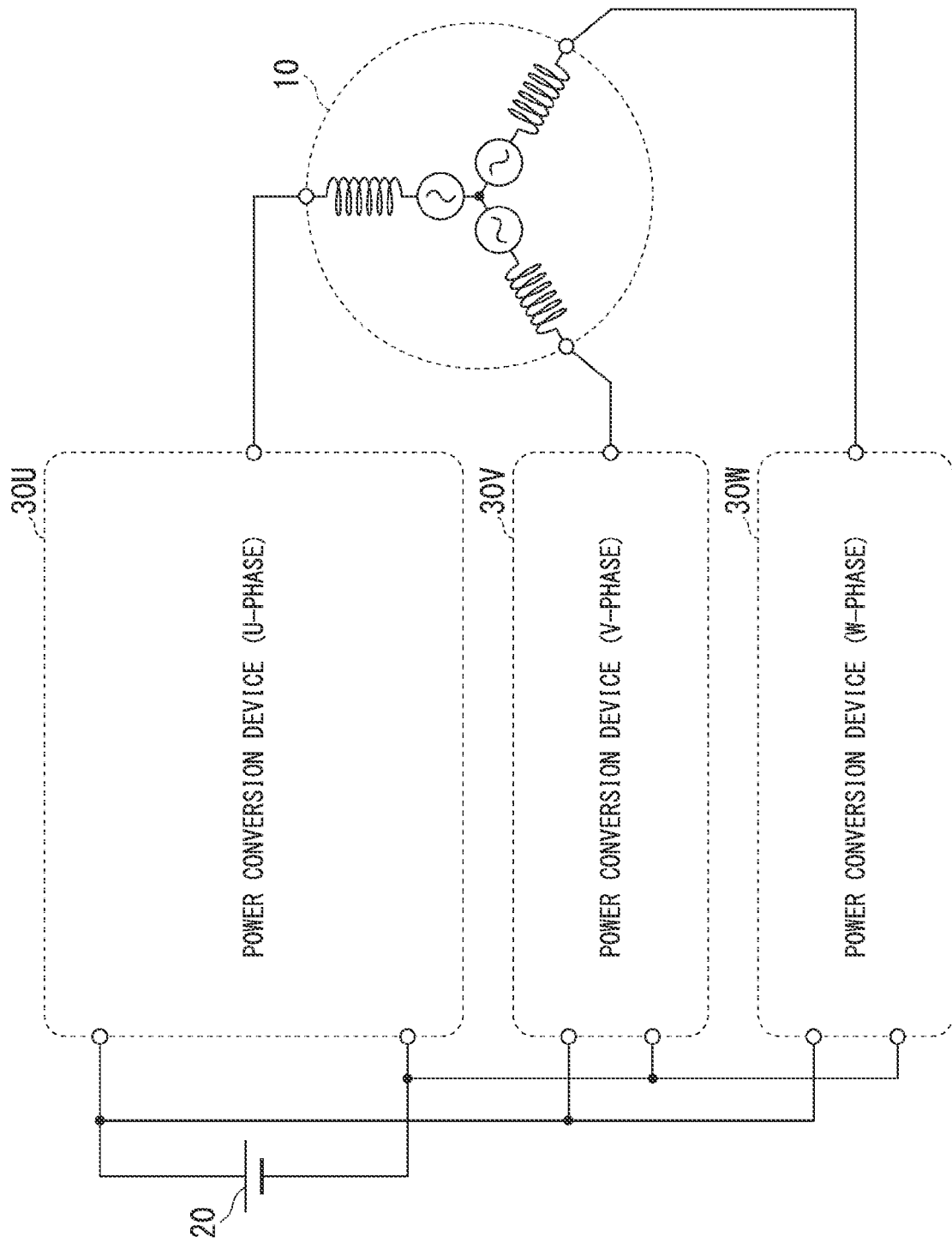
FIG. 2 is a diagram showing an example of an overall configuration of the power conversion device provided in the vehicle.

FIG. 2 is a diagram showing an example of an overall configuration of the power conversion device 30 provided in the vehicle 1. In FIG. 2, the battery 20 and the traveling motor 10 related to the power conversion device 30 are also shown. Although the traveling motor 10 can be driven with the AC power output by one power conversion device 30 when the traveling motor 10 is a single-phase AC motor, it is necessary to output AC power at each phase (a U-phase, a V-phase, or a W-phase) of the three-phase AC when the traveling motor 10 is a three-phase AC motor as described above. Thus, in the vehicle 1, as shown in FIG. 2, the traveling motor 10 is driven with the AC power output by each of the three power conversion devices 30 (a power conversion device 30U, a power conversion device 30V, and a power conversion device 30W). The power conversion device 30U, the power conversion device 30V, and the power conversion device 30W may have the same configuration or may have a configuration in which some components are shared. Each of the power conversion device 30U, the power conversion device 30V, and the power conversion device 30W outputs AC power having the same voltage waveform. Thus, in the vehicle 1, for example, by performing a differential synthesis process for the AC power output by each power conversion device 30, the AC power is converted into AC power having the same voltage waveform and different phases (phases are shifted by 120°) and the converted AC power is output to the traveling motor 10.

Returning to FIG. 1, the power sensor 35 is attached to power wiring on the traveling motor 10 side of the power conversion device 30. The power sensor 35 includes, for example, measurement instruments such as a wattmeter, a voltmeter, and an ammeter, and the power output from the power conversion device 30 to the traveling motor 10 is measured on the basis of the measured values of these measurement instruments (hereinafter referred to as "output power"). The power sensor 35 outputs information of the measured output power of the power conversion device 30 (hereinafter referred to as "output power information") to the control device 100.

The driving operation elements 50 include, for example, an accelerator pedal, a brake pedal, a shift lever, a steering wheel, a variant steering wheel, a joystick, and other operation elements. The driving operation element 50 is equipped with a sensor that detects whether or not the user (the driver) of the vehicle 1 has performed an operation on each operation element or the amount of operation. The driving operation element 50 outputs a detection result of the sensor to the control device 100. For example, an accelerator opening degree sensor is attached to the accelerator pedal, detects the amount of operation on the accelerator pedal by the driver, and outputs the detected amount of operation as an accelerator opening degree to the control device 100. For example, a brake depression amount sensor is attached to the brake pedal, detects the amount of operation on the brake pedal by the driver, and outputs the detected amount of operation as the amount of brake depression to the control device 100. The accelerator opening degree is information for the driver who instructs (requests) the control device 100 to supply power from the battery 20 to the traveling motor 10 while the vehicle 1 is traveling. In other words, the accelerator opening degree is information indicating the amount of power that is supplied to the traveling motor 10 requested by the driver.

The vehicle sensor 60 detects the traveling state of the vehicle 1. The vehicle sensor 60 includes, for example, a vehicle speed sensor that detects the speed of the vehicle 1 or an acceleration sensor that detects the acceleration of the vehicle 1. The vehicle sensor detects a speed of the vehicle 1 and outputs information of the detected speed of the vehicle 1 to the control device 100. The vehicle speed sensor may include, for example, a speed calculator and wheel speed sensors attached to drive wheels 12 of the vehicle 1, and may derive (detect) the speed (the vehicle speed) of the vehicle 1 by integrating wheel speeds detected by the wheel speed sensors. The acceleration sensor detects the acceleration of the vehicle 1 and outputs information of the detected acceleration of the vehicle 1 to the control device 100. The vehicle sensor 60 may include, for example, a yaw rate sensor that detects the angular velocity around the vertical axis of the vehicle 1, a direction sensor that detects the direction of the vehicle 1, and the like. In this case, each sensor outputs the detected detection result to the control device 100.

The external connection device 80 is, for example, a power supply connector such as a universal serial bus (USB) terminal or an accessory socket (a so-called cigar socket), a commercial power outlet for operating a household electric appliance or a personal computer, a connector for connecting to a power system at the time of electric power selling, and the like.

The control device 100 controls an operation of the power conversion device 30 in accordance with a detection result output by each sensor provided in the driving operation elements 50, i.e., an operation of the user (the driver) of the vehicle 1 on each operation element. For example, the control device 100 controls an operation of the power conversion device 30 in accordance with the accelerator opening degree detected by the accelerator opening degree sensor. At this time, the control device 100 controls the operation of the power conversion device 30 in consideration of, for example, the gear ratio of a transmission mechanism controlled by itself, the vehicle speed provided in traveling state information output by the vehicle sensor 60, and the like. In other words, the control device 100 controls the driving force of the traveling motor 10.

For example, the control device 100 may include separate control devices such as a battery control unit, a voltage control unit (VCU) control unit, a power drive unit (PDU) control unit, and a motor control unit. The control device 100 may be replaced with a control device such as a battery electronic control unit (ECU), a VCU-ECU, a PDU-ECU, or a motor ECU.

Each of the control device 100 and the battery control unit, the VCU control unit, the PDU control unit, and the motor control unit constituting the control device 100 may be implemented, for example, by a hardware processor such as a central processing unit (CPU) executing a program (software). Some or all of the functions of these components may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. Some or all of the functions of these components may be implemented by a dedicated LSI circuit. The program may be pre-stored in a storage device (a storage device including a non-transitory storage medium) such as a hard disk drive (HDD) or a flash memory provided in the vehicle 1 or may be stored in a removable storage medium (a non-transitory storage medium) such as a DVD or a CD-ROM and installed in the HDD or the flash memory provided in the vehicle 1 when the storage medium is mounted in a drive device provided in the vehicle 1.

The control device 100 controls a supply amount of AC power supplied from the battery 20 to the traveling motor 10 and a frequency (i.e., a voltage waveform) of the supplied AC power when the vehicle 1 travels. Thus, the control device 100 outputs information for changing the supply amount of AC power and the voltage waveform to the power conversion device 30. More specifically, the control device 100 outputs information such as a voltage value of AC power, a timing when DC power is output from the battery 20, an output waveform profile for generating the AC voltage waveform, and a switching timing of the output waveform profile to the power conversion device 30.

First Embodiment

[Configuration of Power Conversion Device]

Figure 3:
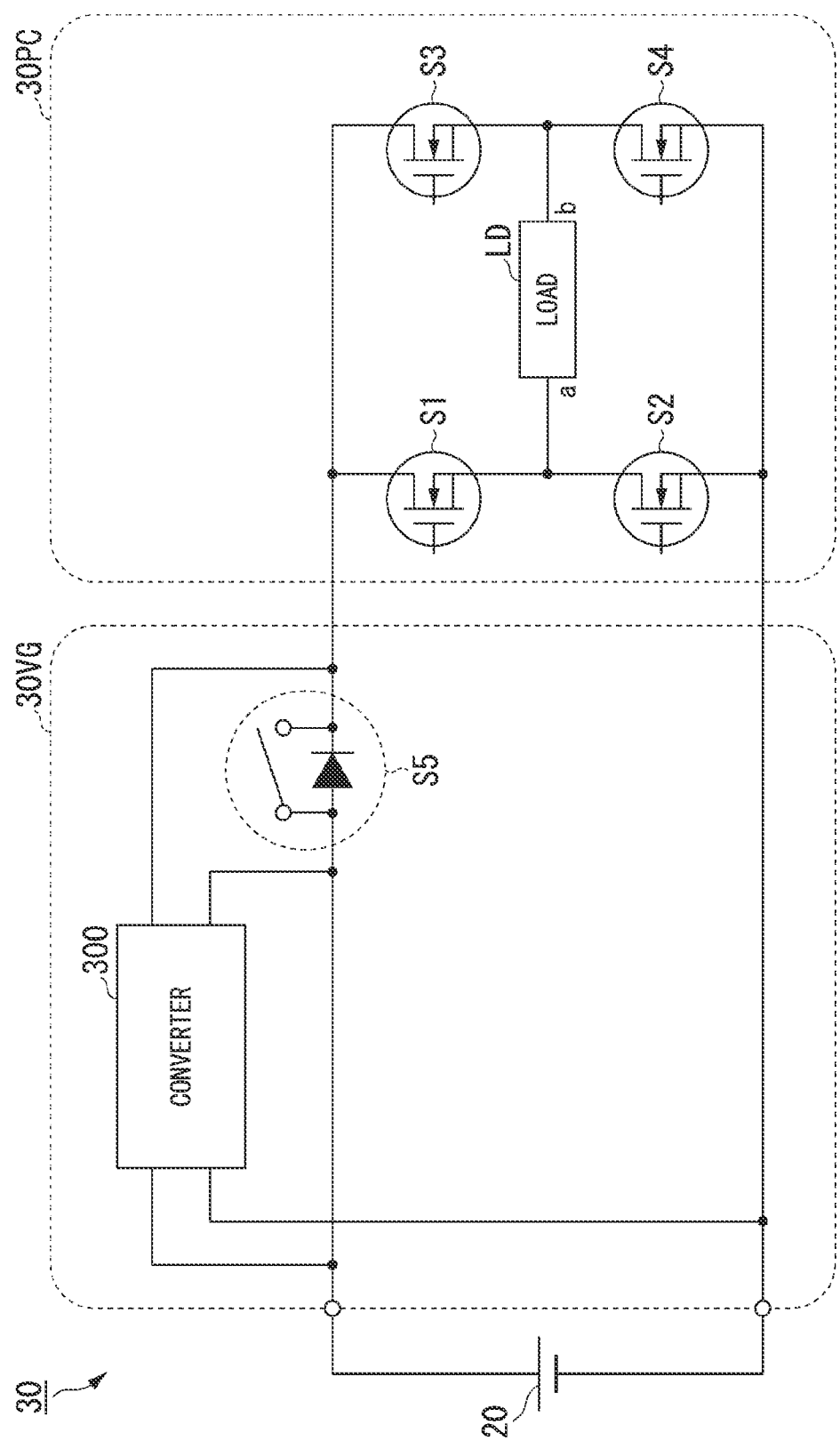
FIG. 3 is a diagram showing an example of a configuration of a power conversion device according to a first embodiment.

FIG. 3 is a diagram showing an example of a configuration of the power conversion device 30 according to the first embodiment. In FIG. 3, a battery 20 and a load LD related to the power conversion device 30 are also shown. The power conversion device 30 shown in FIG. 3 is a power conversion device 30 corresponding to any one of the U-phase, the V-phase, and the W-phase of the three-phase AC in the traveling motor 10 provided in the vehicle 1. Accordingly, the load LD is an inductive load of any phase in the traveling motor 10 provided in the vehicle 1. The power conversion device 30 includes, for example, a voltage waveform generator 30VG and a single-phase converter 30PC.

The voltage waveform generator 30VG generates a half-wave voltage waveform of sinusoidal waves on the basis of the DC power supplied (discharged) from the battery 20. The single-phase converter 30PC performs conversion into a voltage waveform of sinusoidal waves by inverting even-numbered half-waves when power of a voltage waveform generated by the voltage waveform generator 30VG is supplied to the load LD. The voltage waveform generator 30VG includes, for example, a converter 300 and a switching element S5. The single-phase converter 30PC includes, for example, four switching elements (switching elements S1 to S4). Although the switching element S1 and the switching element S2 are shown as components of the single-phase converter 30PC in FIG. 3, the switching element S1 and the switching element S2 are also components belonging to the voltage waveform generator 30VG. The voltage waveform generator 30VG and the single-phase converter 30PC are examples of a "switching unit" in the claims and the single-phase converter 30PC is an example of a "first generator" and an "inversion unit" in the claims.

The converter 300 outputs the output power of the voltage waveform based on the output waveform profile that has been input or set. The output waveform profile is sequentially input or set by, for example, the control device 100. The output waveform profile may be sequentially switched by the controller provided in the converter 300. The configuration of the converter 300 will be described below. The converter 300 is an example of a "first converter" in the claims. The output power output by the converter 300 is an example of "first output power" in the claims and the voltage waveform of the output power output by the converter 300 is an example of a "first voltage waveform" in the claims.

Each of the switching elements S1 to S4 is a semiconductor switching element. Each of the switching elements S1 to S4 constitutes a switching circuit for supplying power to the load LD. In FIG. 3, an example in which each of the switching elements S1 to S4 is a field-effect transistor (FET) is shown. Each of the switching elements S1 to S4 switches a direction of the power supplied to the load LD (a direction of a current flowing through the load LD) in accordance with, for example, a control process of the control device 100 for a conductive state and a non-conductive state. The control device 100 controls the switching element S1 connected to a first end a side of the load LD and the switching element S4 connected to a second end b side of the load LD as the same set and controls the switching element S2 connected to the first end a side of the load LD and the switching element S3 connected to the second end b side of the load LD as the same set. Thereby, when the control device 100 puts the switching element S1 and the switching element S4 in the conductive state and puts the switching element S2 and the switching element S3 in the non-conductive state, the current flows from the first end a side to the second end b side in the load LD. In contrast, when the control device 100 puts the switching element S2 and the switching element S3 in the conductive state and puts the switching element S1 and the switching element S4 in the non-conductive state, the current flows from the second end b side to the first end a side in the load LD. Thereby, when the output power is not output from the converter 300, a voltage waveform of the power output by the switching circuit (hereinafter referred to as a "switching waveform") is supplied to the load LD. Although the voltage waveform of the switching waveform output by the switching circuit fluctuates (the voltage value fluctuates) during a switching period, the voltage waveform of the power corresponds to a rectangular waveform if it is assumed that there is no fluctuation (a certain voltage value is maintained) during the switching period. In the following description, the switching waveform corresponding to the rectangular waveform is referred to as a "rectangular switching waveform." At this time, for example, the control device 100 may be configured to make the phase of the power of the rectangular switching waveform supplied to the load LD different (shift the phase by 120°) by shifting a timing for controlling each of the switching elements S1 to S4 so that each of the switching elements S1 to S4 is in the conductive state and the non-conductive state with respect to a timing for controlling each of the switching elements S1 to S4 provided in the power conversion device 30 corresponding to another phase of the three-phase AC so that each of the switching elements S1 to S4 is in the conductive state and the non-conductive state. The configuration of each of the switching elements S1 to S4 is an example of a "first generator" in the claims and power whose voltage waveform supplied to the load LD according to the configuration of each of the switching elements S1 to S4 is a rectangular waveform is an example of "second output power" in the claims. Further, the configuration of each of the switching elements S1 to S4 is also an example of an "inversion unit" in the claims.

The switching element S5 limits a direction in which the output power output from the converter 300 is supplied. In FIG. 3, an example of a case where the switching element S5 includes a diode and a switch is shown. The switching element S5 limits a direction in which the output power output from the converter 300 is supplied, for example, in accordance with a control process of the control device 100. When the traveling motor 10 for traveling of the vehicle 1 is driven, the control device 100 controls the switch provided in the switching element S5 so that the switch is in the non-conductive state. Thereby, the switching element S5 allows the output power output from the converter 300 to be supplied to the load LD side (i.e., the traveling motor 10) and the output power output from the converter 300 is prevented from being supplied to the positive electrode side of the battery 20. On the other hand, when the traveling motor 10 operates as the regenerative brake to charge the battery 20 with the power generated by the traveling motor 10, the control device 100 controls the switch provided in the switching element S5 so that the switch is in a conductive state. Thereby, the switching element S5 allows the output power output from the load LD to be supplied to the positive electrode side of the battery 20.

Figure 4:
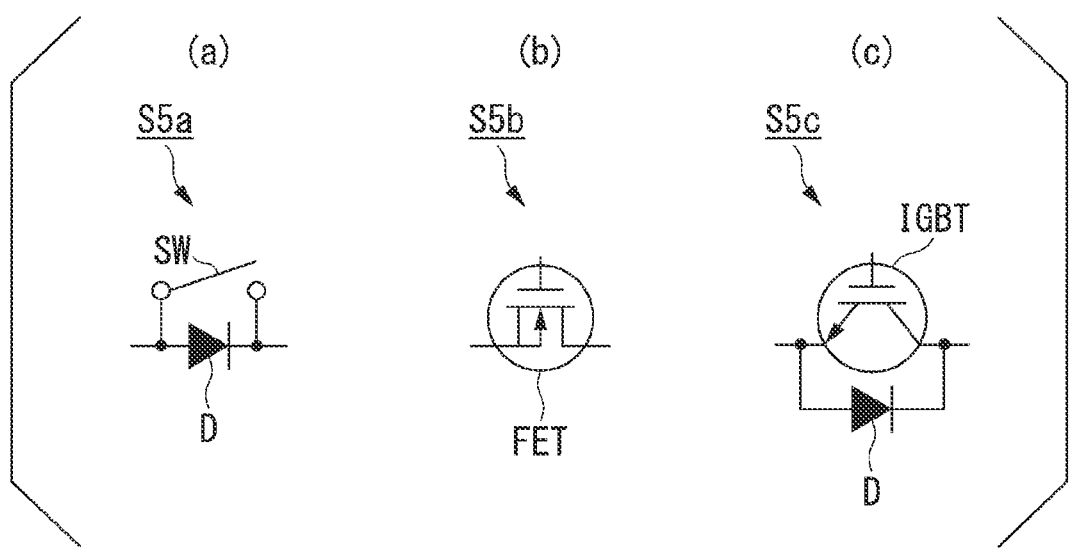
FIG. 4 is a diagram showing an example of a configuration of a switching element provided in the power conversion device.

The configuration of the switching element S5 is not limited to the configuration shown in FIG. 3. FIG. 4 is a diagram showing an example of a configuration of the switching element S5 provided in the power conversion device 30. A switching element S5a shown in (a) of FIG. 4 has a configuration of the diode D and the switch SW shown in FIG. 3. A switching element S5b shown in (b) of FIG. 4 is an example of a case where the switching element S5b includes the field-effect transistor FET. A switching element S5c shown in (c) of FIG. 4 is an example of a case where the switching element S5c includes the diode D and the insulated gate bipolar transistor (IGBT). ON and OFF states of the field-effect transistor FET provided in the switching element S5b shown in (b) of FIG. 4 and the insulated gate bipolar transistor IGBT provided in the switching element S5c shown in (c) of FIG. 4 are controlled by, for example, the control device 100, as in the switch SW provided in the switching element S5a shown in (a) of FIG. 4. The switching element S5 is an example of a "switching unit" and a "first switching element" in the claims.

[Voltage Waveform Generated by Power Conversion Device]

Figure 5:
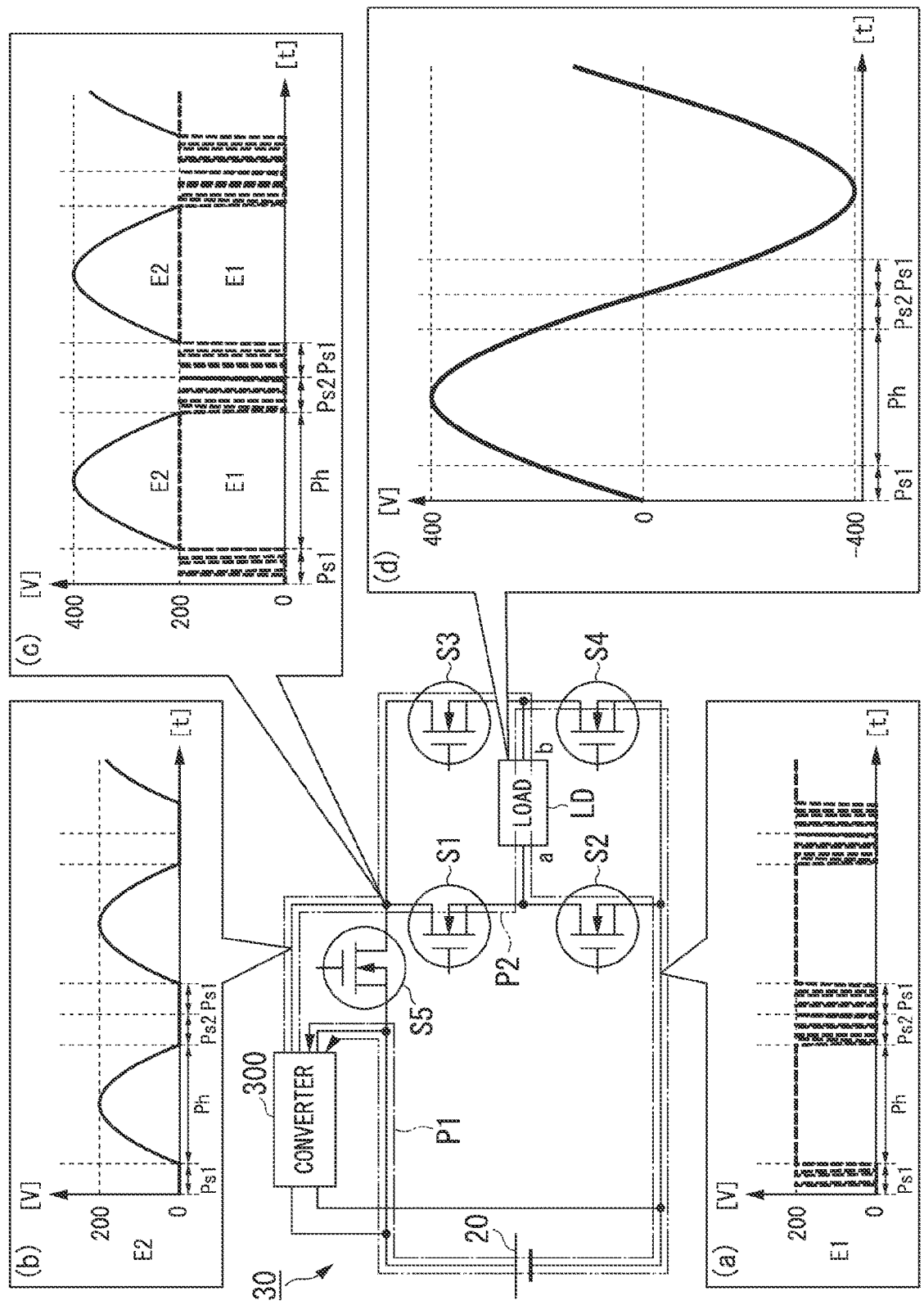
FIG. 5 is a diagram showing an example of a voltage waveform generated in a power conversion device.

FIG. 5 is a diagram showing an example of a voltage waveform generated by the power conversion device 30. In FIG. 5, the example of the power conversion device 30 when the switching element S5 includes a field-effect transistor FET (see (b) of FIG. 4) is shown. In FIG. 5, an example of a voltage waveform at each location is shown in the configuration diagram of the power conversion device 30 in which the related battery 20 and the load LD are also shown.

The power conversion device 30 generates power E1 whose voltage waveform as shown in (a) of FIG. 5 is a rectangular switching waveform in accordance with the control process of the control device 100 for the switching circuit (the switching elements S1 to S4). That is, in the power conversion device 30, the switching circuit generates and outputs the power E1 having a rectangular switching waveform of a frequency for driving the traveling motor 10 which is the load LD in accordance with the control process of the control device 100. More specifically, a voltage value (200 [V] in (a) of FIG. 5) of the DC power supplied when the battery 20 is discharged is held during an ON-holding period Ph in accordance with a control process of the control device 100 at a prescribed interval and the power E1 having a rectangular switching waveform whose voltage value fluctuates between 0 [V] and 200 [V] is generated during a switching period Ps1 and a switching period Ps2. The power E1 of the rectangular switching waveform shown in (a) of FIG. 5 has a voltage waveform generated by the switching circuit when the output power is not output from the converter 300, i.e., when the control device 100 has stopped the operation of the power conversion device 30. The voltage waveform of the power E1 shown in (a) of FIG. 5 is an example of a case where power is supplied to the load LD through a current path P1 when the power is supplied to the load LD if the vehicle 1 is allowed to travel. The voltage waveform of the power E1 when the power is supplied to the load LD through a current path P2 is equivalent to a voltage waveform obtained by inverting the voltage waveform of the power E1 shown in (a) of FIG. 5.

In the power conversion device 30, when the operation of the converter 300 is started by the control device 100, the converter 300 generates and outputs output power E2 of a voltage waveform as shown in (b) of FIG. 5 on the basis of the output waveform profile input or set by the control device 100. The output waveform profile input or set by the control device 100 is for generating a voltage waveform obtained by subtracting the voltage waveform of the power E1 output by the switching circuit from half-waves of sinusoidal waves of a frequency for driving the traveling motor 10. More specifically, the output waveform profile includes three first to third output waveform profiles. The first output waveform profile is a profile in which a voltage value of the output power E2 is zero during the switching period Ps1 in which the voltage value of the output power E2 is smaller than a voltage value of the DC power (hereinafter referred to as a "DC voltage value") supplied when the battery 20 is discharged. The second output waveform profile is a profile in which the voltage value of the output power E2 is increased from a state in which the voltage value of the output power E2 is zero as in the half-waves of the sinusoidal waves during the ON-holding period Ph and is decreased as in the half-waves of the sinusoidal waves from the time when the voltage value of the output power E2 is equal to the DC voltage value. The third output waveform profile is a profile in which a state in which the voltage value of the output power E2 is zero is maintained during the switching period Ps2 when the voltage value of the output power E2 becomes zero. The control device 100 causes the output power E2 of the voltage waveform as shown in (b) of FIG. 5 to be output from the converter 300 by sequentially inputting or setting these three output waveform profiles to or in the converter 300 in accordance with a timing for controlling the switching circuit.

In the power conversion device 30, the power E1 and the output power E2 output by the converter 300 are combined on the load LD side of the switching element S5. That is, the power conversion device 30 performs a waveform synthesis process for the voltage waveform of the power E1 and the voltage waveform of the output power E2 on the load LD side of the switching element S5. Thereby, as shown in (c) of FIG. 5, the voltage value is a value (400 [V] in (c) of FIG. 5) that is twice the DC voltage value when the battery 20 is discharged, the voltage waveform is a rectangular switching waveform during the switching period Ps1 and the switching period Ps2, and power of a synthesized waveform obtained by performing a waveform synthesis process for half-waves of sinusoidal waves on the basis of the rectangular switching waveform (voltage value=200 [V]) during the period of the ON-holding period Ph is supplied to the terminal of the load LD. More specifically, power of a voltage value, which is twice the DC voltage value, is supplied to the second end b side when power is supplied to the load LD along the current path P1 and is supplied to the first end a side when power is supplied to the load LD along the current path P2.

Incidentally, in the power conversion device 30, the control device 100 controls the switching circuit so that the power E1 having a rectangular switching waveform as shown in (a) of FIG. 5 is generated. Thus, the direction of the current flowing through the load LD is different between the case where the power is supplied to the load LD along the current path P1 and the case where the power is supplied to the load LD along the current path P2. Thereby, as shown in (d) of FIG. 5, power whose voltage waveform has sinusoidal waves (full waves) of a frequency for driving the traveling motor 10 is supplied to the load LD. Thereby, the traveling motor 10 is driven (rotated) with the supplied power of the sinusoidal waves. The power of the sinusoidal waves (the full waves) is an example of "third output power" in the claims and a voltage waveform of the sinusoidal waves (the full waves) is an example of a "control waveform" in the claims.

[Configuration of Converter]

Figure 6:
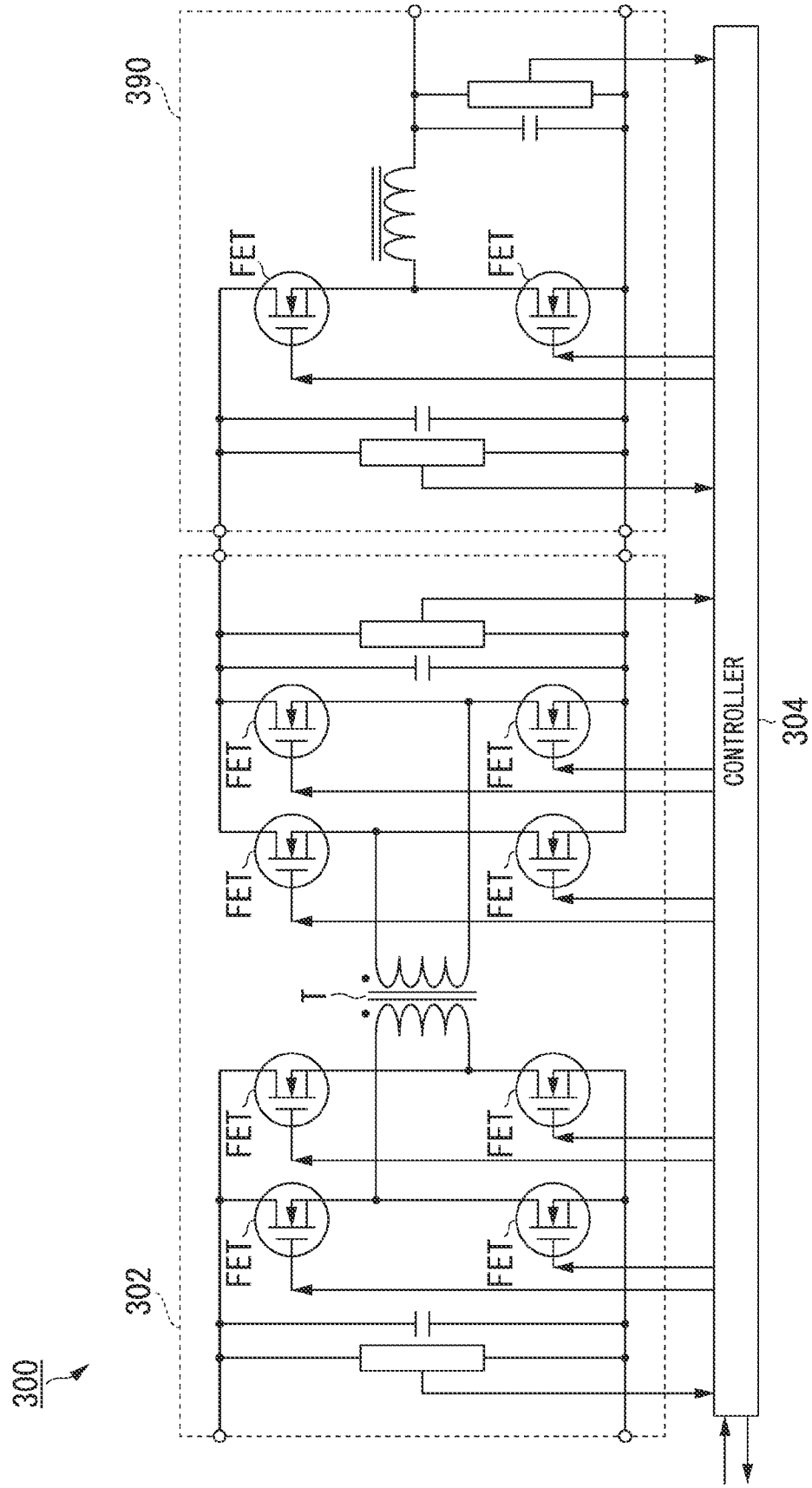
FIG. 6 is a diagram showing an example of a configuration of a converter provided in a power conversion device.
Figure 7:
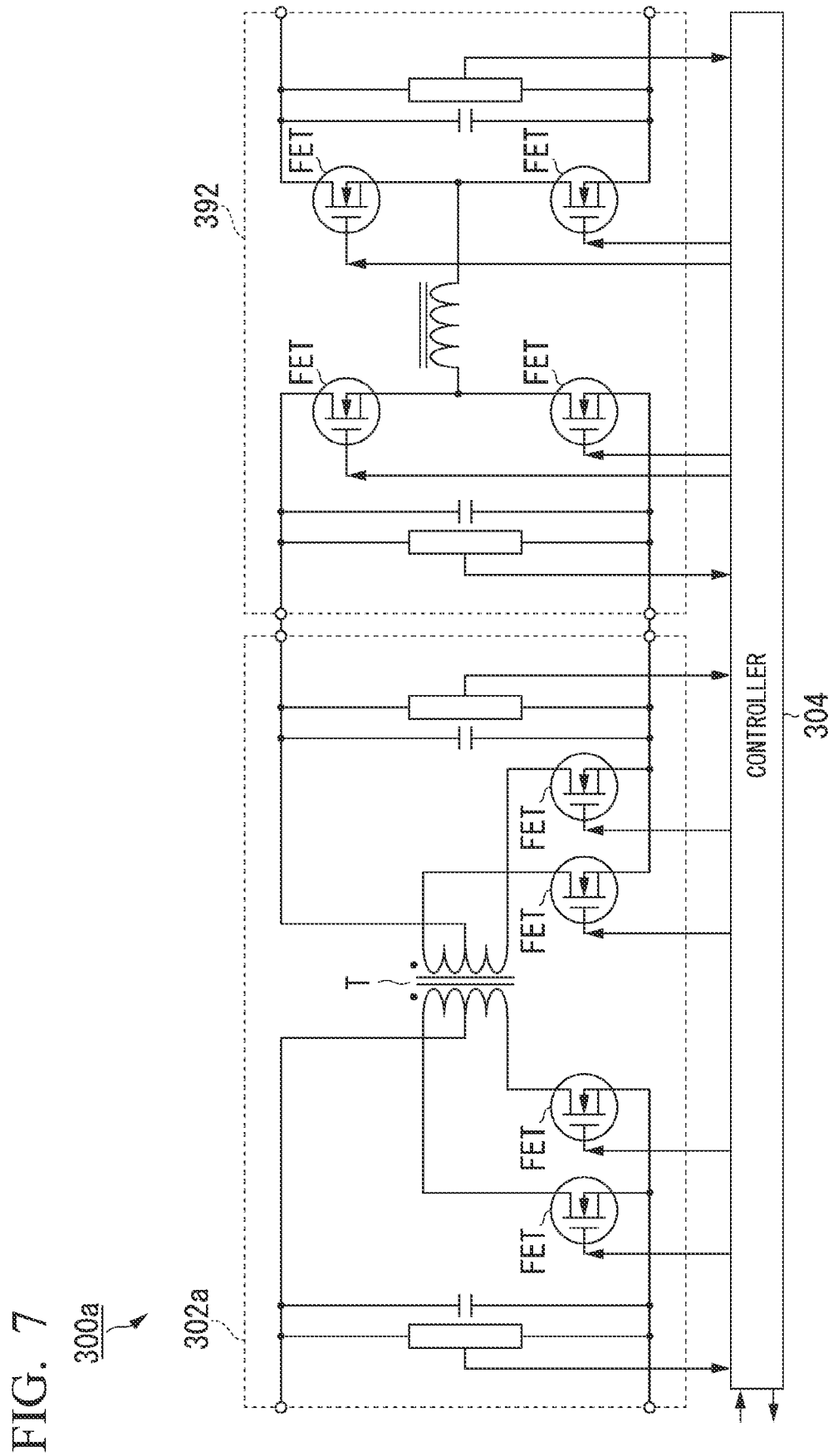
FIG. 7 is a diagram showing another example of the configuration of the converter provided in the power conversion device.

FIGS. 6 and 7 are diagrams showing an example of a configuration of the converter 300 provided in the power conversion device 30. The converter 300 shown in FIG. 6 includes, for example, a DC-DC converter 302 and a controller 304. In FIG. 6, a configuration in which a buck-boost chopper 390 is connected to the DC-DC converter 302 is shown. The converter 300 (hereinafter referred to as a "converter 300a") having another configuration shown in FIG. 7 includes, for example, a DC-DC converter 302a and a controller 304. In FIG. 7, a configuration in which a buck-boost converter 392 is connected to the DC-DC converter 302a is shown.

The DC-DC converter 302 is a bridge-type bidirectional isolated DC-DC converter in which a transformer T is connected between a primary-side full bridge circuit and a secondary-side full bridge circuit each having a configuration in which four field-effect transistors FET are bridge-connected. The DC-DC converter 302a is a push-pull type bidirectional isolated DC-DC converter in which a transformer T is connected between a primary-side circuit and a secondary-side circuit each having a configuration in which two field-effect transistors FET are connected in series. Because the configurations and the operations of the DC-DC converter 302 and the DC-DC converter 302a are equivalent to the configuration and the operation of the existing bidirectional isolated DC-DC converter, a detailed description thereof will be omitted.

Each of the buck-boost chopper 390 and the buck-boost converter 392 is an example of a configuration for boosting or lowering the power generated by the traveling motor 10 to a voltage with which the battery 20 is charged when the traveling motor 10 operates as a regenerative brake. In the converter 300 shown in FIG. 6, the buck-boost converter 392 may be connected to the DC-DC converter 302 instead of the buck-boost chopper 390. In the converter 300a shown in FIG. 7, the buck-boost chopper 390 may be connected to the DC-DC converter 302a instead of the buck-boost converter 392. The configuration for boosting or lowering a voltage of the power generated by the traveling motor 10 to the voltage with which the battery 20 is charged is not limited to the buck-boost chopper 390 and the buck-boost converter 392. Because the configurations and the operations of the buck-boost chopper 390 and the buck-boost converter 392 are equivalent to the configuration and operation of the existing buck-boost circuit, a detailed description thereof will be omitted.

The controller 304 controls an ON state and an OFF state of each field-effect transistor FET provided in the DC-DC converter 302 or the DC-DC converter 302a in accordance with a control process of the control device 100. Further, the controller 304 controls an ON state and an OFF state of each field-effect transistor FET provided in the buck-boost chopper 390 and the buck-boost converter 392 in accordance with a control process of the control device 100. The controller 304 generates a gate drive signal for driving a gate of each field-effect transistor FET. Although a configuration in which the controller 304 controls the field-effect transistor FET provided in the buck-boost chopper 390 and the buck-boost converter 392 in FIGS. 6 and 7, the field-effect transistor FET provided in the buck-boost chopper 390 and the buck-boost converter 392 may be controlled by another controller (not shown) that operates in connection with the controller 304.

[Configuration of Controller]

Figure 8:
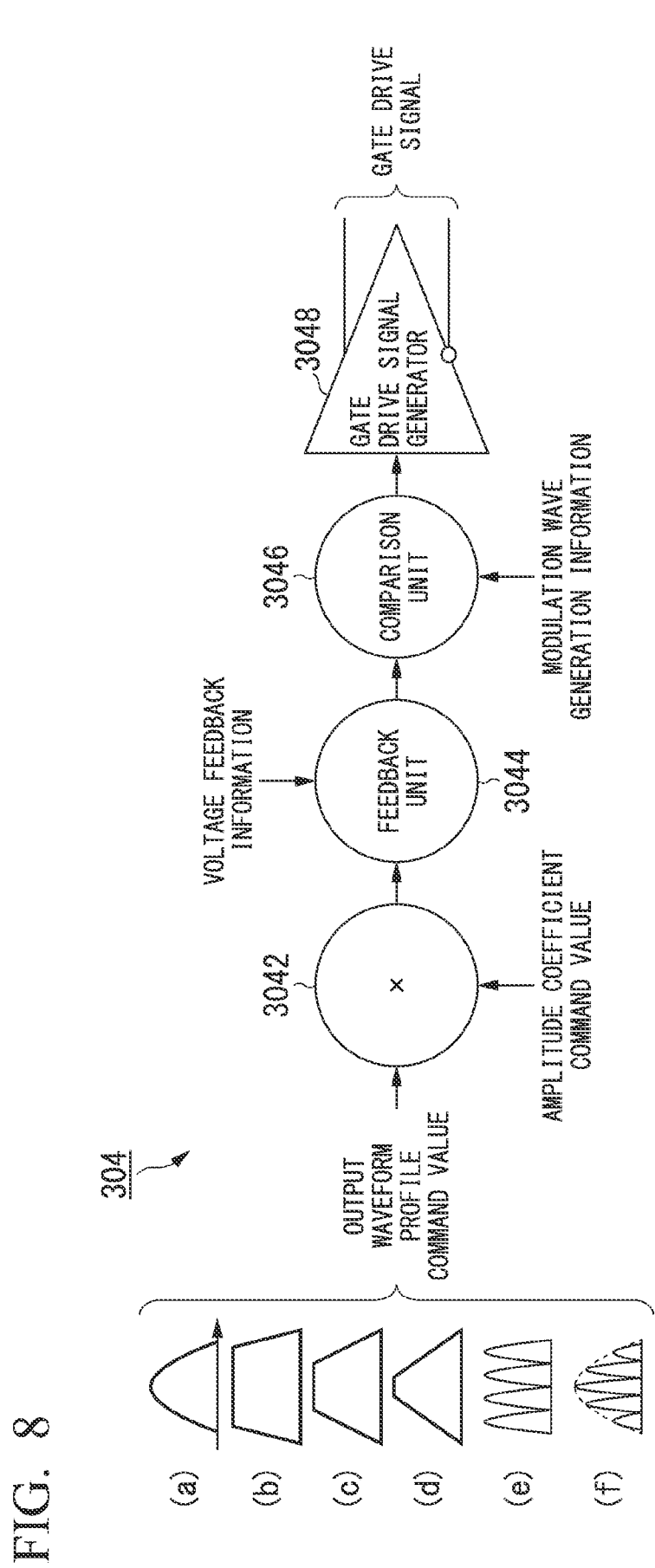
FIG. 8 is a diagram showing an example of a functional configuration of a controller provided in the converter.

FIG. 8 is a diagram showing an example of a functional configuration of the controller 304 provided in the converter 300. In the following description, it is assumed that the controller 304 shown in FIG. 8 is the controller 304 provided in the converter 300. In FIG. 8, a configuration related to the control function of the DC-DC converter 302 in the controller 304 is shown. The controller 304 includes, for example, a multiplier 3042, a feedback unit 3044, a comparison unit 3046, and a gate drive signal generator 3048.

The multiplier 3042 multiplies a command value of the output waveform profile input or set by the control device 100 by an amplitude coefficient command value input by the control device 100 and obtains a voltage value to be output from the DC-DC converter 302. In FIG. 8, the drawings (a) to (f) show examples of the output waveform profile. The multiplier 3042 obtains a voltage value to be output from the DC-DC converter 302 by multiplying the command value of the output waveform profile such that the voltage waveform corresponds to the output waveform profile as shown in (a) to (f) of FIG. 8 by the amplitude coefficient command value for each sampling timing. The amplitude coefficient command value is a target value of output power to be output to the converter 300.

The feedback unit 3044 performs feedback control on the basis of voltage feedback information input by the control device 100. The feedback unit 3044 generates a voltage control pulse for approximating the present voltage value output from the DC-DC converter 302 to the voltage value obtained by the multiplier 3042 in the feedback control. The feedback control in the feedback unit 3044 is, for example, PID control in which proportional (P), integral (I), and differential (D) control is combined. The feedback control in the feedback unit 3044 is not limited to the PID control and may be another feedback control method.

The comparison unit 3046 modulates the voltage control pulse generated by the feedback unit 3044 in a modulation algorithm according to the modulation wave generation information input by the control device 100. The comparison unit 3046 modulates the voltage control pulse in a modulation algorithm such as pulse width modulation (PWM), pulse density modulation (PDM), or Δ-Σ modulation. The modulation wave generation information is information for designating these modulation algorithms. The comparison unit 3046 outputs a modulated signal obtained by modulating the voltage control pulse.

The gate drive signal generator 3048 generates a gate drive signal to be input to a gate terminal of each field-effect transistor FET provided in the DC-DC converter 302 on the basis of the modulated signal modulated by the comparison unit 3046. Thereby, each field-effect transistor FET provided in the power conversion device 30 is turned on or off in accordance with the input gate drive signal and output power of the voltage waveform (see (b) of FIG. 5) corresponding to the frequency for driving the traveling motor 10 according to the output waveform profile input or set by the control device 100 is output from the DC-DC converter 302.

[Configuration of Control Device]

Figure 9:
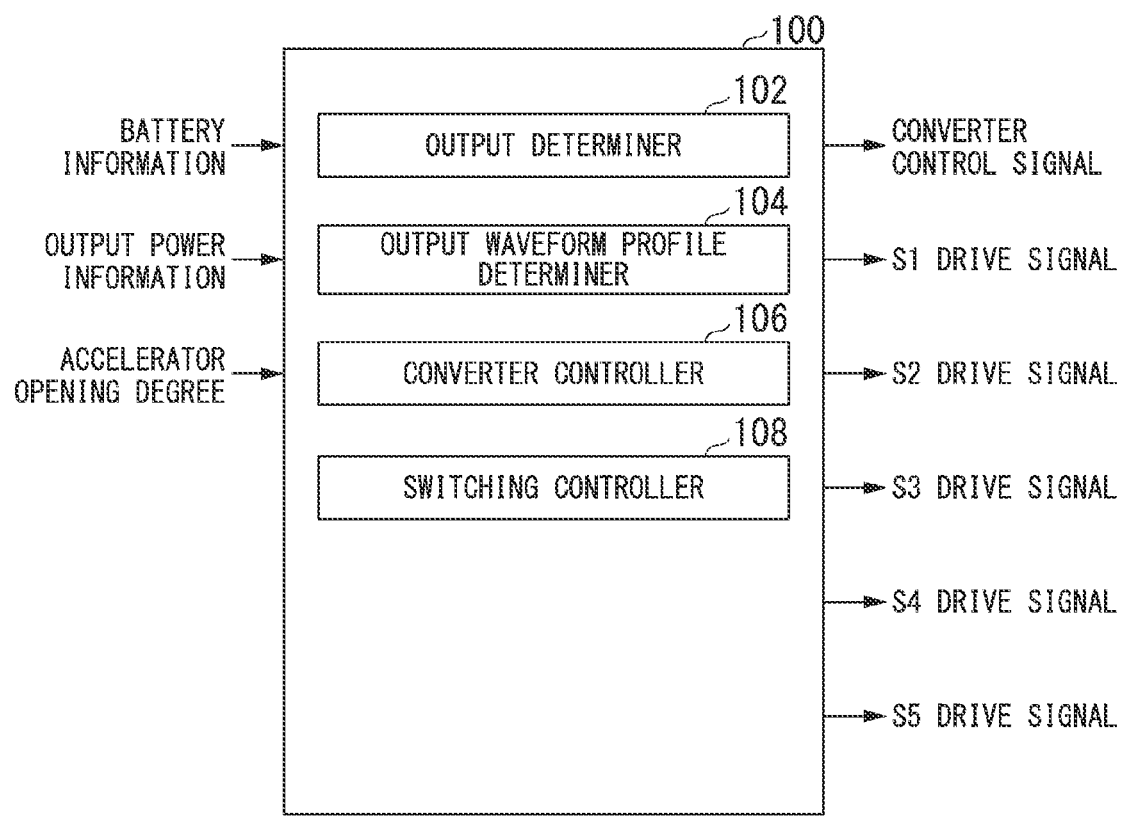
FIG. 9 is a diagram showing an example of a configuration of a control device provided in the vehicle.

Here, an example of a configuration of the control device 100 provided in the vehicle 1 will be described. FIG. 9 is a diagram showing an example of the configuration of the control device 100 provided in the vehicle 1. In FIG. 9, the configuration of the control device 100 related to the power conversion device 30 is shown. The control device 100 includes, for example, an output determiner 102, an output waveform profile determiner 104, a converter controller 106, and a switching controller 108.

The output determiner 102 determines power to be output to the traveling motor 10 on the basis of battery information output by the battery sensor 22, the output power information output by the power sensor 35, and the accelerator opening degree output by the driving operation element 50.

The output waveform profile determiner 104 determines the output waveform profile to be set in the converter 300 on the basis of the power to be output to the traveling motor 10 determined by the output determiner 102.

The converter controller 106 controls the converter 300 on the basis of the power to be output to the traveling motor 10 determined by the output determiner 102 and the output waveform profile determined by the output waveform profile determiner 104. That is, the converter controller 106 outputs command values and information to the controller 304 provided in the converter 300. In FIG. 9, the command values and the information output by the converter controller 106 to the controller 304 are shown as converter control signals.

The switching controller 108 controls each switching element provided in the power conversion device 30 on the basis of the power to be output to the traveling motor 10 determined by the output determiner 102. That is, the switching controller 108 outputs a drive signal for controlling the conductive state and the non-conductive state to each of the switching elements S1 to S4 and the switching element S5. In FIG. 9, an S1 drive signal output to the switching element S1 by the switching controller 108, an S2 drive signal output to the switching element S2 by the switching controller 108, an S3 drive signal output to the switching element S3 by the switching controller 108, an S4 drive signal output to the switching element S4 by the switching controller 108, and an S5 drive signal output to the switching element S5 by the switching controller 108 are shown.

[Process of Control Device]

Figure 10:
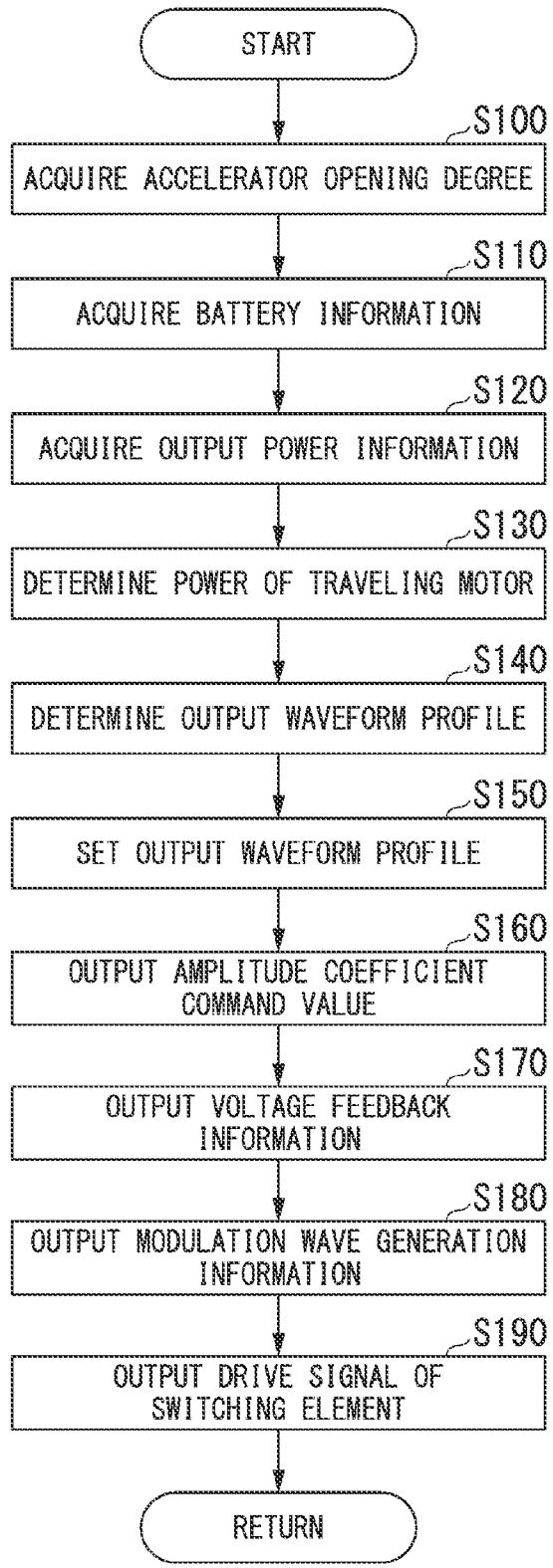
FIG. 10 is a flowchart showing an example of a flow of a process that has been executed when the power conversion device is controlled in the control device provided in the vehicle.

FIG. 10 is a flowchart showing an example of a flow of a process that has been executed when the power conversion device 30 is controlled by the control device 100 provided in the vehicle 1. The process of the present flowchart is iteratively executed while the vehicle 1 is traveling.

The output determiner 102 acquires an accelerator opening degree output by the driving operation element 50 (step S100). The output determiner 102 acquires battery information output by the battery sensor 22 (step S110). The output determiner 102 acquires output power information output by the power sensor 35 (step S120). The output determiner 102 determines power to be output to the traveling motor 10 on the basis of the acquired information (step S130).

The output waveform profile determiner 104 determines an output waveform profile on the basis of the power to be output to the traveling motor 10 determined by the output determiner 102 (step S140).

The converter controller 106 sets the output waveform profile determined by the output waveform profile determiner 104 in the converter 300 (step S150). More specifically, the converter controller 106 outputs a command value of the output waveform profile to the controller 304. The converter controller 106 determines the amplitude coefficient command value on the basis of the power to be output to the traveling motor 10 determined by the output determiner 102 and outputs the determined amplitude coefficient command value to the controller 304 (step S160). The converter controller 106 obtains an adjustment value for adjusting the power output by the power conversion device 30 to the traveling motor 10 on the basis of the output power information acquired by the output determiner 102 and voltage feedback information indicating the obtained adjustment value is output to the controller 304 (step S170). The converter controller 106 determines a modulation method (the modulation algorithm) of modulating the gate drive signal output to each field-effect transistor FET provided in the converter 300 and outputs modulation wave generation information indicating the determined modulation method to the controller 304 (step S180).

The switching controller 108 generates a drive signal for controlling each switching element provided in the power conversion device 30 on the basis of the power to be output to the traveling motor 10 determined by the output determiner 102 and outputs the generated drive signal to each corresponding switching element S (step S190). The control device 100 ends the present process and iterates the process from step S100 again.

According to such a flow of a process, the control device 100 determines the power to be output to the traveling motor 10 on the basis of the accelerator opening degree, the battery information, and the output power information and controls the power conversion device 30 so that the determined power is supplied to the traveling motor 10. Thereby, the power conversion device 30 operates according to the command values and information output by the control device 100 and supplies power to the traveling motor 10. Thereby, the vehicle 1 travels with a driving force (rotational power) of the traveling motor 10.

According to such a configuration, the power conversion device 30 converts DC power supplied (discharged) from the battery 20 into AC power for driving the traveling motor 10 in accordance with a control process of the control device 100 and outputs the AC power to the traveling motor 10. Moreover, when the DC power from the battery 20 is boosted and output to the traveling motor 10, the power conversion device 30 outputs power obtained by waveform-synthesizing power E1 whose voltage waveform based on the DC power supplied when the battery 20 is discharged is a rectangular switching waveform as shown in FIG. 5 with output power E2 of a voltage waveform generated on the basis of an output waveform profile from DC power supplied when the battery 20 is discharged to the traveling motor 10. In other words, in the power conversion device using a conventional inverter, it is necessary to provide a boost chopper or the like in a subsequent stage of the inverter, i.e., it is necessary to configure the converter in two stages. However, the power conversion device 30 includes the converter 300, i.e., the power conversion device 30 can be implemented with only a one-stage converter. Therefore, the power conversion device 30 can limit the deterioration of the power conversion efficiency as compared with that of the conventional configuration including a two-stage converter even if the reduction rate of the power conversion efficiency between the conventional inverter and the converter 300 is the same. More specifically, for example, when the power conversion efficiencies of both the inverter and the converter 300 are 98%, the total conversion efficiency of the power conversion device using the conventional inverter becomes 98%. When a two-stage converter is used in a conventional power conversion device, the overall conversion efficiency is further reduced to 96%. On the other hand, in the power conversion device 30, because the DC power of the battery 20 is simply switched, the power E1 whose conversion efficiency can be said to be substantially 100% is combined with the output power E2 whose conversion efficiency is 98% output by the converter 300. Thus, in the power conversion device 30, assuming that a ratio between the power E1 and the output power E2 is fifty-fifty, the total conversion efficiency becomes 99%. As described above, in the power conversion device 30, the overall conversion efficiency is higher than that of the conventional power conversion device in which the inverter is used and the boost chopper is connected in series to the inverter, i.e., the deterioration of the power conversion efficiency can be limited.

As shown in FIG. 5, the power conversion device 30 can supply power having a voltage value that is twice a DC voltage value when the battery 20 is discharged to the traveling motor 10 by performing waveform synthesis. Although it is necessary to configure an inverter using, for example, a component of a high withstand voltage increased by a factor of 2, to cope with a battery that is discharged to supply power of the same voltage value when a value of a voltage supplied to the traveling motor 10 is 400 [V], for example, in the power conversion device using the conventional inverter, it is only necessary to adopt a configuration corresponding to a battery that is discharged to supply power of a voltage value of 200 [V] (a half-voltage value) in the power conversion device 30 and it is possible to configure the power conversion device 30 using a component having a lower withstand voltage than a conventional component. Thus, in the power conversion device 30, it is possible to limit an increase in loss due to the use of a high withstand voltage component. In the power conversion device 30, because the voltage applied to each of the constituent components is lower than a conventional voltage, the deterioration of each component such as, for example, an insulating member or a winding of a transformer, can be limited.

Further, because the converter 300 generates output power E2 (see (b) of FIG. 5) of a voltage waveform for reproducing sinusoidal waves (half-waves of sinusoidal waves) on the basis of an output waveform profile, the power conversion device 30 does not generate harmonics that are generated in the power conversion process of the conventional inverter. Thus, in the power conversion device 30, the AC waveform of the AC power supplied to the traveling motor 10 is not distorted and characteristics such as noise, torque ripple, and iron loss are not affected.

Even in a power conversion device using a conventional inverter, a configuration in which the generation of harmonics is limited can be implemented by providing a smoothing filter such as, for example, an LC filter, in a stage further subsequent to the boost chopper provided in a stage subsequent to the inverter. However, it is difficult to implement a configuration in which the constant is variable in the LC filter and a physical size becomes large when the voltage waveform has a low frequency or the power capacity is large. Thus, a configuration in which an LC filter is provided as a countermeasure against harmonics generated in a power conversion device using a conventional inverter is a configuration suitable for the application to a system that converts power in a constant state such as a constant voltage constant frequency (CVCF) power supply and is not suitable for the application of a system of a variable voltage variable frequency (VVVF) power supply in which a range of a frequency of power of sinusoidal waves to be supplied when the traveling motor 10 is driven (rotated) as in the vehicle 1 is wide. This is because it is necessary to change the voltage waveform of power for driving the traveling motor 10 in a wide range from a low frequency to a high frequency so that high torque is generated from a state in which the rotational speed of the traveling motor 10 is zero when the vehicle 1 starts from a stopped state and the traveling motor 10 is driven at a high rotational speed when the vehicle 1 is allowed to travel at the maximum speed. A conventional inverter provided with an LC filter can be applied to the vehicle 1 as a power conversion device. However, in this case, as described above, because the frequency range of the power required to be supplied to the traveling motor 10 is wide, it is necessary to increase the physical size of the LC filter. Further, when a process of converting the DC power supplied (discharged) from the battery 20 into AC power for operating household electric appliances at the time of emergency or the like or for supplying power to a power system in an electric power selling process or the like is taken into consideration, it is unnecessary to provide an LC filter as in the power conversion device using a conventional inverter and it can be said that the configuration of the power conversion device 30 that can directly supply power is a more effective configuration.

As described above, the power conversion device 30 can perform power conversion more efficiently than the power conversion device using a conventional inverter.

A configuration in which the switching circuit including the switching elements S1 to S4 generates the power E1 of the rectangular switching waveform of a frequency for driving the traveling motor 10 that is the load LD on the basis of the DC power supplied when the battery 20 is discharged in the power conversion device 30 has been described. However, for example, the power conversion device 30 may be configured to include another switching circuit different from the switching circuit including the switching elements S1 to S4 and the switching circuit (not shown) may be configured to generate the power E1 of the rectangular switching waveform based on the DC power supplied when the battery 20 is discharged.

Modified Example of First Embodiment

In the above-described power conversion device 30, the configuration of the power conversion device 30 including one converter 300 has been described. Thus, the above-described power conversion device 30 has a configuration in which power having a voltage value that is twice a value of a DC voltage supplied (discharged) from the battery 20 can be supplied to the traveling motor 10. However, a case in which the voltage value of the power that needs to be supplied to the traveling motor 10 is further large may be taken into consideration. In this case, the power conversion device 30 may be configured to further include the converter 300 and therefore may be configured to supply power having a higher voltage value to the traveling motor 10. An example of this case will be described below.

Modified Example of Configuration of Power Conversion Device

Figure 11:
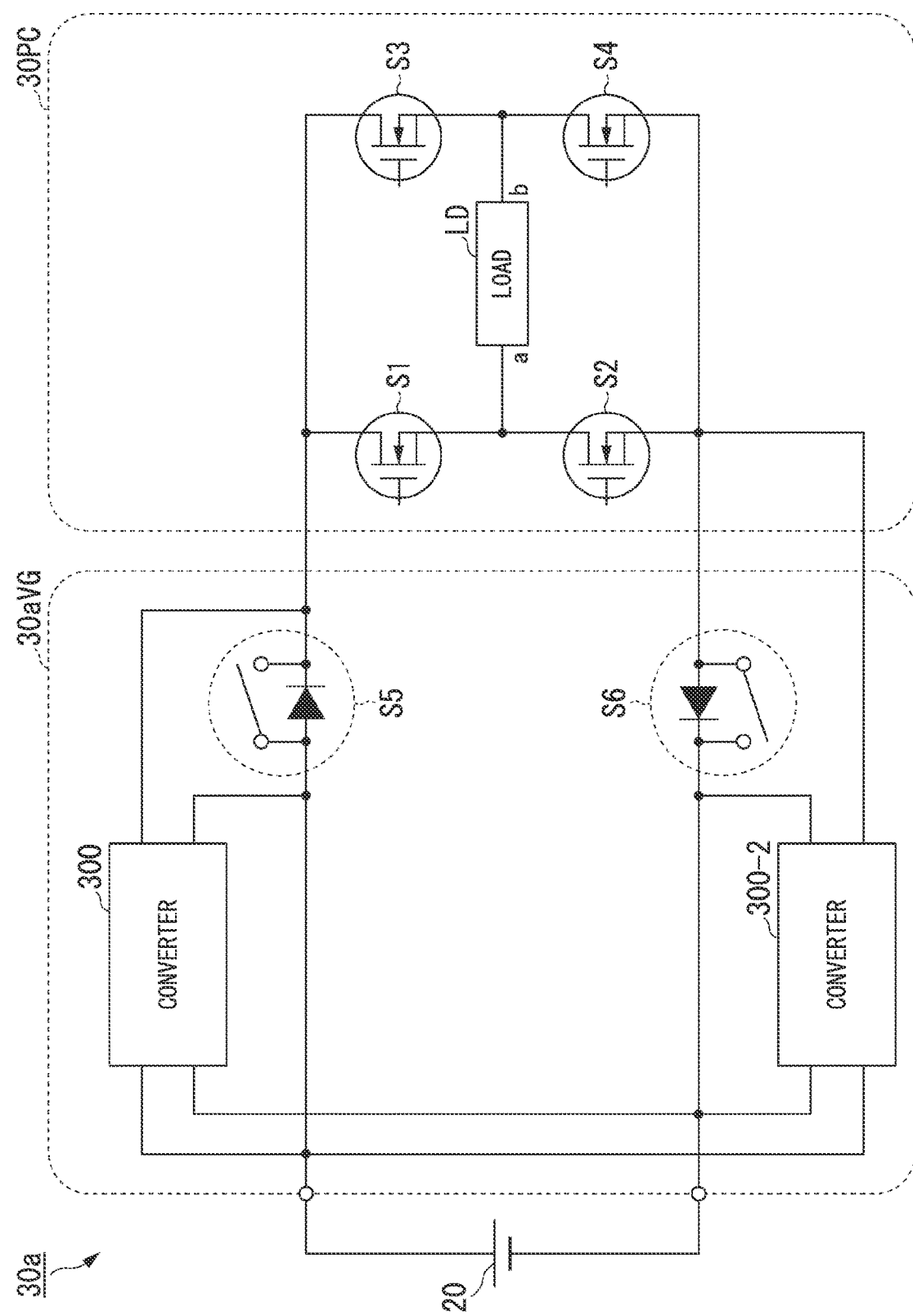
FIG. 11 is a diagram showing an example of a configuration of a modified example of the power conversion device according to the first embodiment.

FIG. 11 is a diagram showing an example of a configuration of a modified example of the power conversion device 30 according to the first embodiment. The power conversion device 30 of the modified example shown in FIG. 11 is also a power conversion device 30 corresponding to any one of a U-phase, a V-phase, and a W-phase of a three-phase AC in the traveling motor 10 provided in the vehicle 1. In FIG. 11, the battery 20 and the load LD related to the power conversion device 30 (hereinafter referred to as a "power conversion device 30a") of the modified example are also shown. The power conversion device 30a includes, for example, a voltage waveform generator 30aVG and a single-phase converter 30PC. Although the switching element S1 and the switching element S2 are shown as components of the single-phase converter 30PC in FIG. 11, the switching element S1 and the switching element S2 are also components belonging to the voltage waveform generator 30aVG.

Like the voltage waveform generator 30VG, the voltage waveform generator 30aVG generates a half-wave voltage waveform of sinusoidal waves on the basis of the DC power supplied (discharged) from the battery 20. The voltage waveform generator 30aVG includes, for example, two converters 300 (converters 300 and 300-2) and two switching elements S (switching elements S5 and S6). The voltage waveform generator 30aVG has a configuration in which the converter 300-2 and the switching element S6 are added to the voltage waveform generator 30VG.

The converter 300-2 is a converter having the same configuration as the converter 300. However, in the converter 300-2, an output waveform profile different from that of the converter 300 is input or set by the control device 100. The converter 300-2 outputs output power of a voltage waveform (output power of a rectangular waveform) in which a timing when a waveform changes is different from that of a part corresponding to a rectangular waveform in a rectangular switching waveform generated by the single-phase converter 30PC (the switching elements S1 to S4) (i.e., the so-called duty ratio is different between a period when the voltage value in the rectangular waveform is 0 [V] and a period when the voltage value in the rectangular waveform is 200 [V]) and the voltage value is held at 0 [V] during the switching period on the basis of the output waveform profile input or set by the control device 100. The converter 300-2 is an example of a "second generator" in the claims and the output power output by the converter 300-2 is an example of "fourth output power" in the claims.

The switching element S6 limits a direction in which the output power output from the converter 300-2 is supplied, for example, in accordance with the control process of the control device 100. The switching element S6 is a switching element S having the same configuration as the switching element S5. When the control device 100 controls the switch so that the switch is in the non-conductive state, the switching element S6 allows the output power output from the converter 300-2 to be supplied to the load LD side and the output power output from the converter 300-2 is prevented from being supplied to the positive electrode side of the battery 20. On the other hand, when the control device 100 controls the switch so that the switch is in the conductive state, the switching element S6 allows the output power output from the load LD to be supplied to the negative electrode side of the battery 20. Although an example of a case where the switching element S6 includes a diode and a switch is shown in FIG. 11, the switching element S6 may include the field-effect transistor FET or the diode D and the insulated gate bipolar transistor IGBT like the switching element S5 (see FIG. 4). The switching element S6 is an example of a "switching unit" and a "second switching element" in the claims.

[Voltage Waveform Generated by Power Conversion Device of Modified Example]

Figure 12:
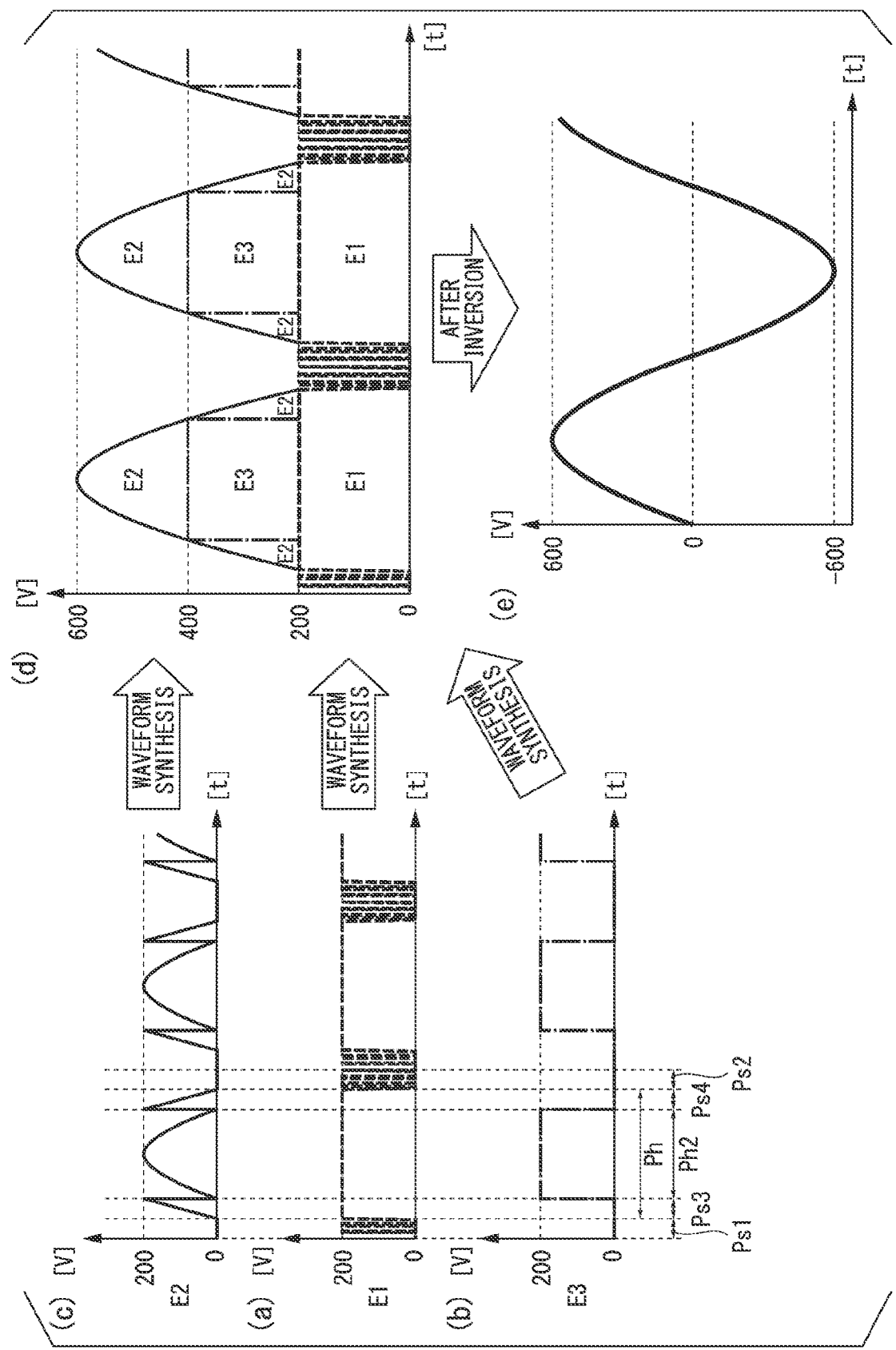
FIG. 12 is a diagram showing an example of a voltage waveform generated in a power conversion device of a modified example.

FIG. 12 is a diagram showing an example of a voltage waveform generated in the power conversion device 30a of the modified example. In FIG. 12, an example of a state in which voltage waveforms of power output by the switching circuit (the switching elements S1 to S4), the converter 300, and the converter 300-2 provided in the power conversion device 30a are subjected to a waveform synthesis process in accordance with a control process of the control device 100 when a value of a DC voltage supplied (discharged) from the battery 20 is 200 [V] is schematically shown.

In the power conversion device 30a, the switching circuit generates and outputs power E1 having a rectangular switching waveform of a frequency for driving the traveling motor 10 that is the load LD, as shown in (a) of FIG. 12, in accordance with a control process of the control device 100. More specifically, the switching circuit generates the power E1 of the rectangular switching waveform in which the voltage waveform fluctuates (the voltage value fluctuates) during the switching period Ps1 and the switching period Ps2 and the DC voltage value when the battery 20 is discharged is held during the ON-holding period Ph.

In the power conversion device 30a, if the operation of the converter 300-2 is started by the control device 100, the converter 300-2 generates and outputs output power E3 of the voltage waveform as shown in (b) of FIG. 12 on the basis of the output waveform profile input or set by the control device 100. The output waveform profile (hereinafter referred to as an "output waveform profile #2") input to or set in the converter 300-2 by the control device 100 is for generating a voltage waveform that is a rectangular waveform in which a period for holding the DC voltage value becomes an ON-holding period Ph2 shorter than the ON-holding period Ph for holding the DC voltage value in the power E1 output by the switching circuit. More specifically, the output waveform profile #2 includes three first to third output waveform profiles #2. The first output waveform profile #2 is a profile in which the voltage value of the output power E3 becomes 0 [V] during periods that are the switching period Ps1 and a switching period Ps3. The second output waveform profile #2 is a profile in which the voltage value of the output power E3 becomes equal to the DC voltage value (200 [V]) during the ON-holding period Ph2. The third output waveform profile #2 is a profile in which the voltage value of the output power E3 becomes 0 [V] during periods that are a switching period Ps4 and the switching period Ps2. The control device 100 causes the output power E3 of the voltage waveform as shown in (b) of FIG. 12 to be output from the converter 300-2 by sequentially inputting or setting these three output waveform profiles #2 to or in the converter 300-2 in accordance with a timing when the switching circuit is controlled.

In the power conversion device 30a, when the operation of the converter 300 is started by the control device 100, the converter 300 generates and outputs the output power E2 of the voltage waveform as shown in (c) of FIG. 12 on the basis of the output waveform profile input or set by the control device 100. The output waveform profile input to or set in the converter 300 by the control device 100 is for generating a voltage waveform by subtracting the voltage waveform of the power E1 output by the switching circuit and the voltage waveform of the output power E3 output by the converter 300-2 from half-waves of sinusoidal waves of a frequency for driving the traveling motor 10. More specifically, the output waveform profile includes first to seventh output waveform profiles. The first output waveform profile is a profile for setting a state in which the voltage value of the output power E2 is zero during the switching period Ps1. The second output waveform profile is a profile for increasing the voltage value of the output power E2 from the state in which the voltage value of the output power E2 is zero along half-waves of sinusoidal waves during the switching period Ps3. The third output waveform profile is a profile for setting the voltage value of the output power E2 to zero when the voltage value of the output power E2 becomes equal to the DC voltage value. The fourth output waveform profile is a profile for increasing the voltage value of the output power E2 from the state in which the voltage value of the output power E2 becomes zero as in the half-waves of the sinusoidal waves and decreasing the voltage value of the output power E2 as in the half-waves of the sinusoidal waves from the time when the voltage value of the output power E2 becomes equal to the DC voltage value during a period which is the ON-holding period Ph2. The fifth output waveform profile is a profile for making the voltage value of the output power E2 equal to the DC voltage value when the voltage value of the output power E2 becomes zero. The sixth output waveform profile is a profile for decreasing the voltage value of the output power E2 from the state in which the voltage value of the output power E2 becomes equal to the DC voltage value to the state in which the voltage value of the output power E2 becomes zero along the half-waves of the sinusoidal waves during a period which is the switching period Ps4. The seventh output waveform profile is a profile for maintaining the state in which the voltage value of the output power E2 is zero during a period which is the switching period Ps2 when the voltage value of the output power E2 becomes zero. The control device 100 causes the output power E2 of the voltage waveform as shown in (c) of FIG. 12 to be output from the converter 300 by sequentially inputting or setting these seven output waveform profiles to or in the converter 300 in accordance with a timing when the switching circuit is controlled.

In the power conversion device 30a, a waveform synthesis process is performed for the voltage waveform of the power E1, the voltage waveform of the output power E2, and the voltage waveform of the output power E3 on the load LD side of the switching element S5 and the switching element S6. Thereby, as shown in (d) of FIG. 12, after a waveform synthesis process is performed for half-waves of sinusoidal waves on the basis of a rectangular switching waveform (voltage value=200 [V]) during periods which are the switching period Ps3, the ON-holding period Ph2, and the switching period Ps4, synthesized waveform power whose voltage value is three times a DC voltage value when the battery 20 is discharged (600 [V] in (d) of FIG. 12) and whose voltage waveform is a rectangular switching waveform during periods which are the switching period Ps1 and the switching period Ps2 is supplied to the terminal of the load LD. Even in the power conversion device 30a, according to an operation of the switching circuit (a switching operation), a direction of a current flowing through the load LD is inverted, for example, when the voltage waveform of the power supplied to the load LD is even-numbered half-waves and power of a voltage waveform of sinusoidal waves (full waves) of a frequency for driving the traveling motor 10 as shown in (e) of FIG. 12 is supplied to the load LD. Thereby, the traveling motor 10 is driven (rotated) by the power of the supplied sinusoidal waves.

According to such a configuration, the power conversion device 30a can perform conversion into AC power obtained by boosting the voltage of the DC power supplied (discharged) from the battery 20 by a factor of 3 in accordance with a control process of the control device 100 and output the AC power to the traveling motor 10. Even in this case, like the power conversion device 30, the power conversion device 30a can perform power conversion in which the deterioration of the power conversion efficiency, the increase in the loss due to the use of a high withstand voltage component, and the deterioration of the component are limited as compared with the power conversion device using the conventional inverter.

In the modified example of the above-described first embodiment, a case in which the voltage of the DC power of the battery 20 is boosted three times according to a configuration in which the converter 300-2 and the switching element S6 are added to the converter 300, i.e., the converter 300-2 is stacked, has been described. Likewise, in the power conversion device 30, by stacking the converter 300 and the switching element S, it is possible to increase a multiple by which the voltage of the DC power of the battery 20 is boosted (set the multiple to a factor of 4 or more). In this case, it is only necessary for the configuration, operation, process, and the like of the power conversion device 30 to be equivalent to the configuration, operation, and process of the above-described power conversion device 30a.

Second Embodiment

[Configuration of Power Conversion Device]

Figure 13:
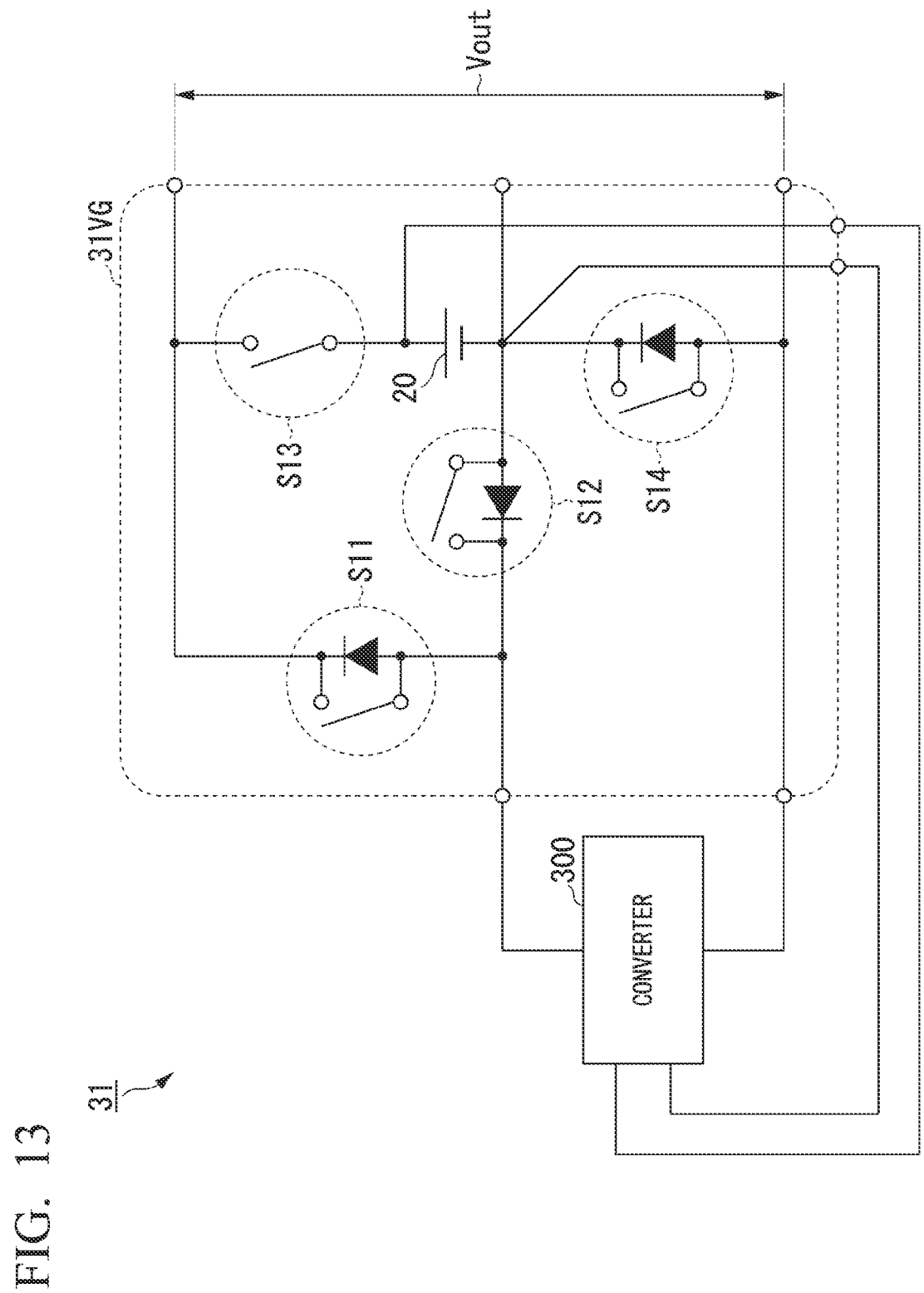
FIG. 13 is a diagram showing an example of a configuration of a power conversion device according to a second embodiment.

FIG. 13 is a diagram showing an example of a configuration of a power conversion device according to a second embodiment. The power conversion device of the second embodiment shown in FIG. 13 (hereinafter referred to as a "power conversion device 31") is also similar to the power conversion device 30 of the first embodiment and is a power conversion device corresponding to one of a U-phase, a V-phase, and a W-phase of a three-phase AC in a traveling motor 10 provided in the vehicle 1. In FIG. 13, a battery 20 related to a power conversion device 31 is also shown and the load LD (including the switching elements S1 to S4) shown in the first embodiment is omitted. That is, in FIG. 13, a configuration corresponding to the voltage waveform generator 30VG in the power conversion device 30 of the first embodiment is shown. A voltage waveform generator 31VG may have a configuration in which the switching element S1 and the switching element S2 are provided as components, as in the power conversion device 30 of the first embodiment.

The power conversion device 31 also generates a half-wave voltage waveform of sinusoidal waves on the basis of DC power supplied (discharged) from a battery 20. The power conversion device 31 includes, for example, a converter 300 and four switching elements (switching elements S11 to S14).

The switching element S11 limits a direction in which the output power output from the converter 300 is supplied, for example, in accordance with a control process of the control device 100. In FIG. 13, an example of a case where the switching element S11 includes a diode and a switch is shown. When the control device 100 controls the switch provided in the switching element S11 so that the switch is in a non-conductive state, the switching element S11 allows the output power output from the converter 300 to be supplied to the load LD side (i.e., the traveling motor 10). On the other hand, when the control device 100 controls the switch provided in the switching element S11 so that the switch is in a conductive state, the switching element S11 allows the output power output from the load LD to be supplied to the converter 300 side.

The switching element S12 limits a direction in which the output power output from the converter 300 is supplied, for example, in accordance with the control process of the control device 100. In FIG. 13, an example of a case where the switching element S12 includes a diode and a switch is shown. When the control device 100 controls the switch provided in the switching element S12 so that the switch is in the non-conductive state, the switching element S12 prevents the output power output from the converter 300 from being supplied to the negative electrode side of the battery 20. On the other hand, when the control device 100 controls the switch provided in the switching element S12 so that the switch is in the conductive state, the switching element S12 allows the output power output from the converter 300 to be supplied to the negative electrode side of the battery 20.

The switching element S13 switches the connection between the positive electrode side of the battery 20 and the load LD side. In FIG. 13, an example of a case where the switching element S13 includes a switch is shown. When the control device 100 controls the switch provided in the switching element S13 so that the switch is in the non-conductive state, the switching element S13 causes the positive electrode side of the battery 20 and the load LD side to be connected. On the other hand, when the control device 100 controls the switch provided in the switching element S13 so that the switch is in the conductive state, the switching element S13 causes the positive electrode side of the battery 20 and the load LD side to be disconnected. That is, the control device 100 alternately controls the switching element S13 so that the switching element S13 is in the conductive state and the non-conductive state and therefore the power conversion device 31 can supply power (power E1) whose voltage waveform based on the DC power supplied when the battery 20 is discharged is rectangular to the load LD side. Thus, in the power conversion device 31, a function in which the switching circuit for outputting the power (the power E1) of the rectangular switching waveform in the power conversion device 30 of the first embodiment changes the voltage waveform (changes the voltage value) during the switching period can be omitted. In the power conversion device 30 of the first embodiment, for example, when another switching circuit (not shown) different from the switching circuit including the switching elements S1 to S4 is configured to generate the power E1 having a rectangular switching waveform, this switching circuit (not shown) can be omitted.

The switching element S14 limits a direction of the power supplied to the negative electrode side of the battery 20, for example, in accordance with the control process of the control device 100. In FIG. 13, an example of a case where the switching element S14 includes a diode and a switch is shown. When the control device 100 controls the switch provided in the switching element S14 so that the switch is in the non-conductive state, the switching element S14 allows the output power output from the load LD to be supplied to the negative electrode side of the battery 20. On the other hand, when the control device 100 controls the switch provided in the switching element S14 so that the switch is in the conductive state, the switching element S14 allows the output power output from the negative electrode side of the battery 20 to be supplied to the load LD side.

Figure 14:
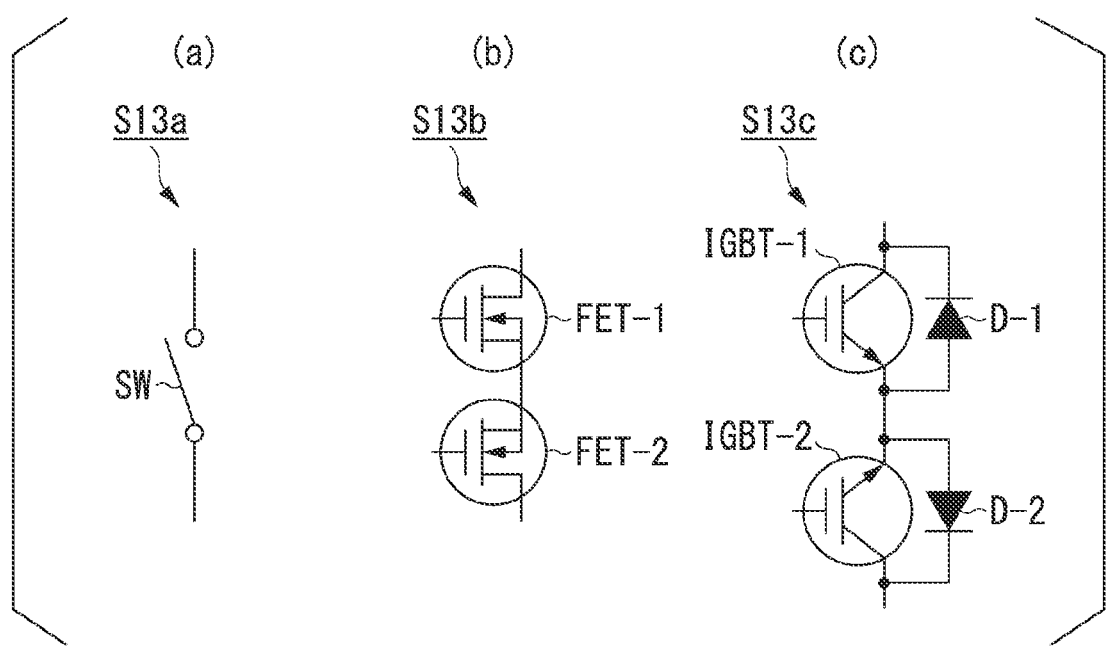
FIG. 14 is a diagram showing an example of a configuration of a switching element provided in the power conversion device.

Although an example of a case where each of the switching element S11, the switching element S12, and the switching element S14 includes a diode and a switch is shown in FIG. 13, a configuration in which a field-effect transistor FET or a diode D and an insulated gate bipolar transistor IGBT are provided may be adopted as in the switching element S5 provided in the power conversion device 30 of the first embodiment (see FIG. 4). Further, the configuration of the switching element S13 is not limited to the configuration shown in FIG. 13. FIG. 14 is a diagram showing an example of a configuration of the switching element S13 provided in the power conversion device 31. A switching element S13a shown in (a) of FIG. 14 has a configuration of a switch SW shown in FIG. 13. A switching element S13b shown in (b) of FIG. 14 is an example of a case where two field-effect transistors FET are connected in series. In the switching element S13b, a field-effect transistor FET-1 and a field-effect transistor FET-2 are connected in series in directions opposite to each other. A switching element S13c shown in (c) of FIG. 14 is an example of a case where two switching elements each having a diode D and an insulated gate bipolar transistor IGBT are connected in series. In the switching element S13c, the switching elements are connected in series in directions opposite to each other. The ON and OFF states of the field-effect transistor FET provided in the switching element S13b shown in (b) of FIG. 14 and the insulated gate bipolar transistor IGBT provided in the switching element S13c shown in (c) of FIG. 14 are controlled by, for example, the control device 100, as in the switch SW provided in the switching element S13a shown in (a) of FIG. 14.

In the power conversion device 31, a connection between the battery 20 and the converter 300 is switched to a series connection or a parallel connection according to the configuration of the switching element S11, the switching element S12, the switching element S13, and the switching element S14. The configuration of the switching element S11, the switching element S12, the switching element S13, and the switching element S14 is an example of a "switching unit" and a "third switching element" in the claims.

Like the configuration of the power conversion device 30 of the first embodiment, the configuration of the power conversion device 31 shown in FIG. 13 is a configuration in which power whose voltage waveform has half-waves of sinusoidal waves is supplied to the load LD side with a voltage value Vout that is twice the DC voltage value when the battery 20 is discharged. Like the power conversion device 30a of the modified example of the first embodiment, the power conversion device 31 can also have a configuration in which power whose voltage waveform has half-waves of sinusoidal waves is supplied to the load LD side with a voltage value Vout that is three times or more the DC voltage value by stacking a configuration similar to that of the voltage waveform generator 31VG including the switching elements S11 to S14 and the battery 20 (here, a different battery). The configuration of the power conversion device 31 in this case will be described below.

[Operation of Power Conversion Device]

Figure 15:
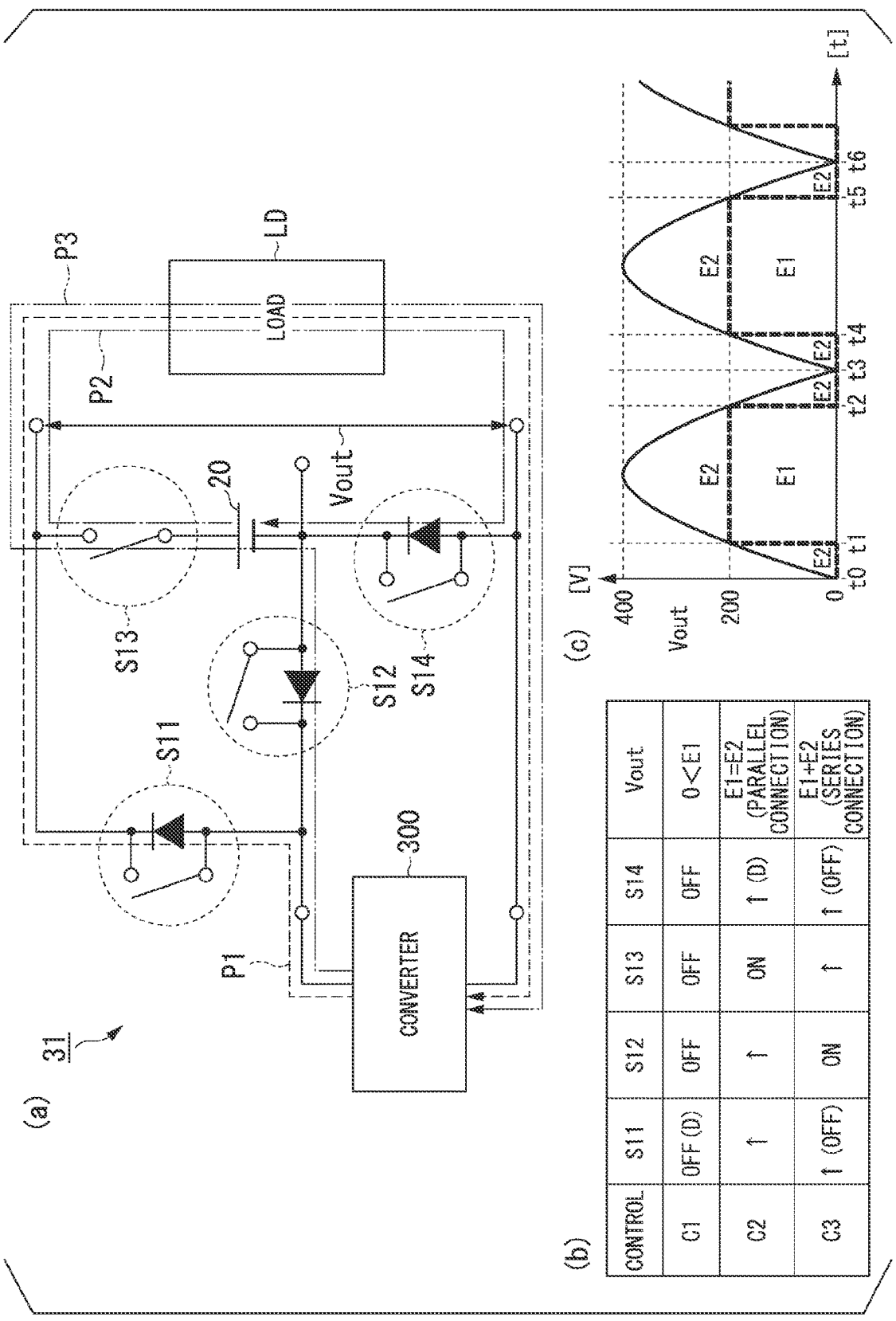
FIG. 15 is a diagram showing an example in which a control device provided in a vehicle controls the power conversion device.
Figure 16:
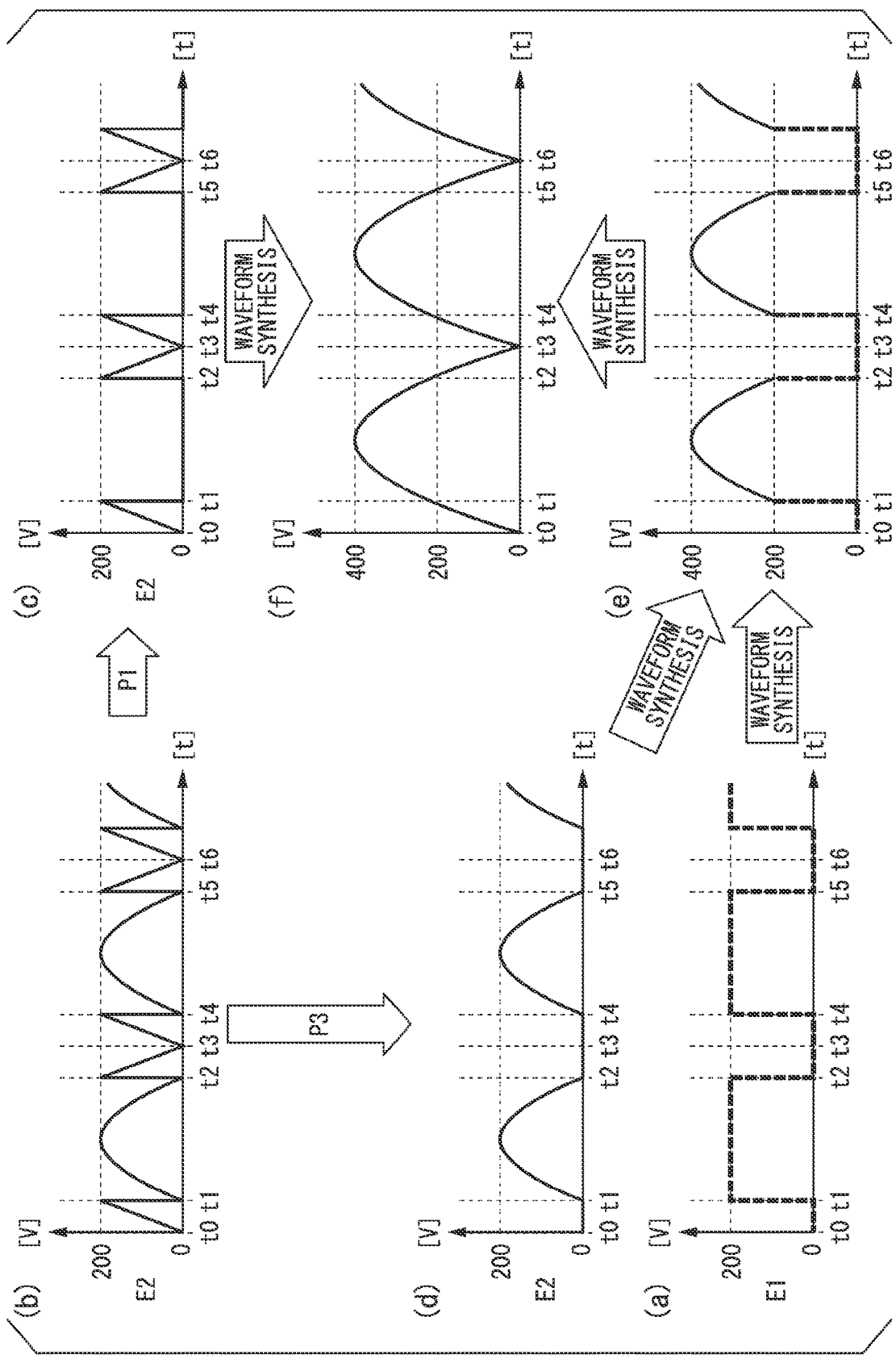
FIG. 16 is a diagram showing an example of a voltage waveform generated in the power conversion device.
Figures 17, 18:
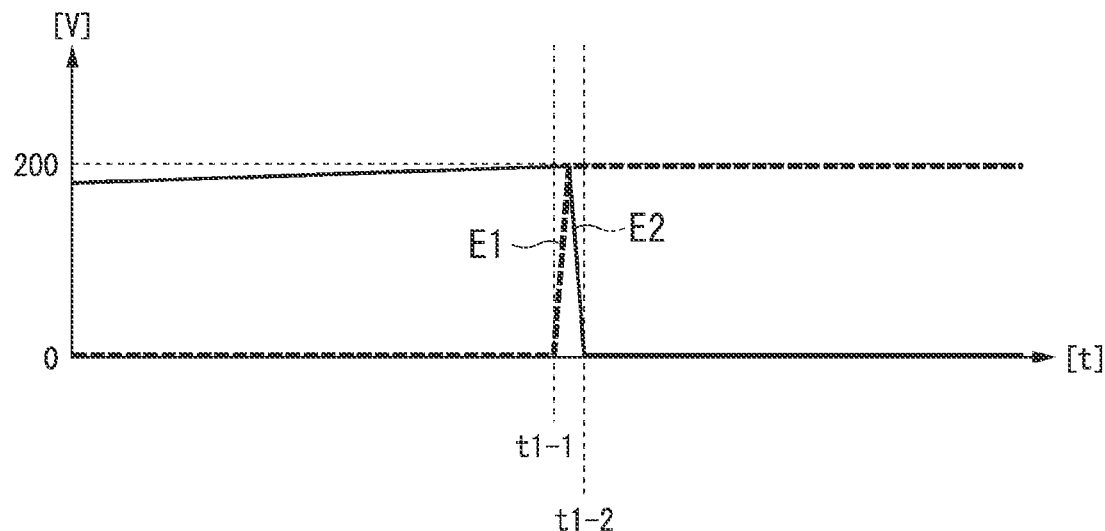
FIG. 17 is a diagram showing an example of detailed timings when the control device provided in the vehicle controls the power conversion device.
FIG. 18 is a diagram showing an example in which the control device provided in the vehicle controls the power conversion device.

Here, an example of a control process of the control device 100 for the power conversion device 31 and an operation of the power conversion device 31 will be described. FIG. 15 is a diagram showing an example in which the control device 100 provided in the vehicle 1 controls the power conversion device 31. FIG. 16 is a diagram showing an example of a voltage waveform generated by the power conversion device 31. FIG. 17 is a diagram showing an example of detailed timings when the control device 100 provided in the vehicle 1 controls the power conversion device 31. FIGS. 15 to 17 are examples of a case where the traveling motor 10 is driven for traveling of the vehicle 1. In (a) of FIG. 15, a load LD (including the switching elements S1 to S4) connected to the power conversion device 31 shown in FIG. 13 is also shown and a path (a current path) of a current flowing through the load LD when power is supplied is shown. In (b) of FIG. 15, a state of the switching element S controlled by the control device 100 when a current flows along each current path is shown. In (b) of FIG. 15, "ON" indicates that the switching element S is controlled so that the switching element S is in the conductive state, "OFF" indicates that the switching element S is controlled so that the switching element S is in the non-conductive state, "↑: upward arrow" indicates that the control for the switching element S has not been changed, and the description in "( ): parentheses" indicates a component flowing through the switching element S. In (c) of FIG. 15, a voltage waveform that is output after the power conversion device 31 performs waveform synthesis is shown. In FIG. 16, an example of a voltage waveform of power supplied to the load LD through each current path in accordance with the control process of the control device 100 and an example of a state in which a waveform synthesis process is performed for voltage waveforms when the DC voltage value supplied (discharged) from the battery 20 is 200 [V] are schematically shown. In FIG. 17, an example of a state of a change in a voltage waveform at a timing when the connection between the battery 20 and the converter 300 is switched to a series connection or a parallel connection when a waveform synthesis process is performed for the voltage waveform of the power supplied to the load LD is shown. In the following description, the operation of the power conversion device 31 will be described with reference to FIGS. 15 to 17 as appropriate.

The control device 100 controls each switching element S as in the stage of control C1 shown in (b) of FIG. 15 at time t0 (=time t3 or time t6) shown in (c) of FIG. 15, i.e., at the time of a state in which the voltage value Vout is smaller than that of the power E1 of the DC voltage value that can be supplied from the battery 20. Thereby, in the power conversion device 31, output power E2 output by the converter 300 is supplied to the load LD side through a current path P1 (the diode D in the switching element S11) shown in (a) of FIG. 15. More specifically, the output power E2 of the voltage waveform as shown in (c) of FIG. 16 within the output power E2 of the voltage waveform as shown in (b) of FIG. 16 generated by the converter 300 is supplied to the load LD side through the current path P1. Thereby, the voltage value Vout of the power supplied to the load LD becomes the voltage value of the output power E2.

Subsequently, the control device 100 controls each switching element S as in the stage of control C2 shown in (b) of FIG. 15 at time t1 (=time t4) shown in (c) of FIG. 15, i.e., when the voltage value Vout is increased to a voltage value equal to the DC voltage value that can be supplied from the battery 20. Thereby, in the power conversion device 31, the power E1 based on the DC power of the battery 20 is supplied to the load LD side through a current path P2 (the diode D in the switching element S14) shown in (a) of FIG. 15. More specifically, the power E1 having a rectangular voltage waveform as shown in (a) of FIG. 16 based on the DC power of the battery 20 is supplied to the load LD side through the current path P2. Thereby, the voltage value Vout of the power supplied to the load LD is a sum of the voltage value of the output power E2 supplied from the current path P1 and the voltage value of the power E1 supplied from the current path P2. In the state of control C2, because the battery 20 and the converter 300 are connected in parallel in the power conversion device 31, the voltage value Vout becomes the voltage value (200 [V]) of the output power E2 and the power E1.

Subsequently, the control device 100 controls each switching element S at time t1 (=time t4) shown in (c) of FIG. 15 as in the stage of control C3 shown in (b) of FIG. 15. Thereby, in the power conversion device 31, the output power E2 supplied to the load LD side through the current path P1 is supplied to the negative electrode side of the battery 20 through the current path P3 (the switch SW in the switching element S12) shown in (a) of FIG. 15. More specifically, the output power E2 of the voltage waveform as shown in (d) of FIG. 16 within the output power E2 of the voltage waveform as shown in (b) of FIG. 16 generated by the converter 300 is supplied to the negative electrode side of the battery 20 through the current path P3. Thereby, a reverse bias is applied to the diode D provided in the switching element S14 and the switching element S14 is turned off (the non-conductive state). In the state of control C3, the converter 300 is connected in series to the battery 20 in the power conversion device 31. Thus, the voltage value Vout of the power supplied to the load LD is a sum of the voltage value of the power E1 supplied through the current path P2 and the voltage value of the output power E2 supplied through the current path P3 as shown in (e) of FIG. 16.

In this way, the control device 100 causes the battery 20 and the converter 300 to be connected in parallel at time t1 and then switches the connection between the battery 20 and the converter 300 to the series connection. Here, detailed timings for switching the connection between the battery 20 and the converter 300 at time t1 will be described with reference to FIG. 17.

The control device 100 switches the control for the switching element S from control C1 to control C2 at a timing of time t1-1 immediately before the voltage value of the output power E2 is about to become a voltage value equal to a value of a DC voltage that can be supplied from the battery 20. The immediately previous timing of time t1-1 is a timing at which the voltage waveform of the power E1 output by the battery 20 becomes voltage value=200 [V] when the voltage waveform of the output power E2 output by the converter 300 becomes voltage value=200 [V]. Thereby, the output of the power E1 based on the DC power is started from the battery 20. Subsequently, the control device 100 switches the control for the switching element S from control C2 to control C3 at a timing of time t1-2 when the voltage value of the output power E2 becomes zero.

In this way, the control device 100 causes the voltage waveform of the output power E2 to overlap the voltage waveform of the power E1 for a short period of time and switches the connection between the battery 20 and the converter 300 from the parallel connection to the series connection. After the control device 100 switches the control for the switching element S from control C2 to control C3 at the timing of time t1-2, the output power E2 is added to the power E1 as the voltage waveform of the output power E2 increases as in the half-waves of the sinusoidal waves (see (e) of FIG. 16).

Subsequently, the control device 100 sets the control for each switching element S to control C2 at time t2 (=time t5) shown in (c) of FIG. 15, i.e., when the voltage value Vout decreases to a voltage value equal to the DC voltage value that can be supplied from the battery 20. Thereby, in the power conversion device 31, the supply of the output power E2 to the negative electrode side of the battery 20 via the current path P3 is stopped and only the power E1 of the battery 20 is supplied to the load LD side through the current path P2.

Subsequently, the control device 100 sets the control for each switching element S to control C1 at time t2 (=time t5) shown in (c) of FIG. 15. Thereby, in the power conversion device 31, the supply of the power E1 to the load LD side via the current path P2 is stopped and only the output power E2 having the voltage waveform as shown in (c) of FIG. 16 is supplied to the load LD side through the current path P1.

In this way, the control device 100 switches the connection between the battery 20 and the converter 300 from the series connection to the parallel connection at time t2, and then disconnects the battery 20. It is only necessary for the detailed timing of the connection switching between the battery 20 and the converter 300 at this time t2 to be equivalent to the reverse of the timing of the connection switching between the battery 20 and the converter 300 described with reference to FIG. 17. Accordingly, a detailed description will be omitted.

According to this control process of the control device 100, in the power conversion device 31, the voltage value Vout of power whose voltage waveform has half-waves of sinusoidal waves based on voltage value=0 [V] is supplied to the load LD with the voltage value that is twice the DC voltage value of the battery 20 as shown in (f) of FIG. 16.

Likewise, the control device 100 also performs a control process even if the traveling motor 10 operates as a regenerative brake and the battery 20 is charged with the generated power. FIG. 18 is a diagram showing an example of a control process of the power conversion device 31 in the control device 100 provided in the vehicle 1. In FIG. 18, the state of the switching element S controlled by the control device 100 when a current flows along each current path so that the battery 20 is charged with power is shown. In FIG. 18, control C1', control C2', and control C3' are control for the switching element S for reversing a direction of the current flowing through the corresponding current path P according to control C1, control C2, and control C3 shown in (b) of FIG. 15. Accordingly, it is only necessary for the operation of the power conversion device 31 when the control device 100 causes the battery 20 to be charged with the power generated by the traveling motor 10 to be equivalent to the reverse of the operation when the traveling motor 10 is driven for traveling of the vehicle 1 described with reference to FIGS. 15 to 17. Therefore, a detailed description will be omitted.

[Process of Control Device]

Figure 19:
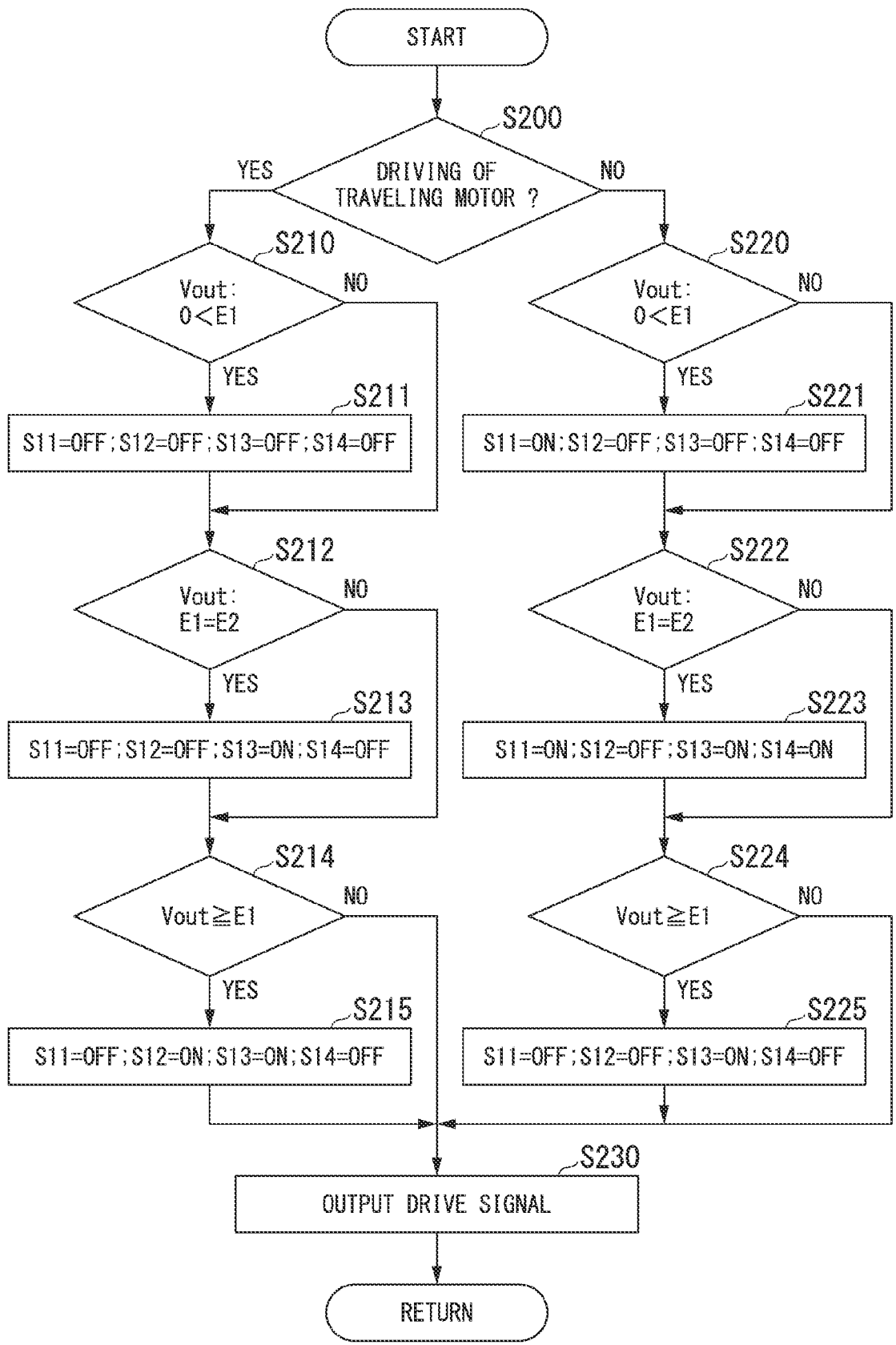
FIG. 19 is a flowchart showing an example of a flow of a process that has been executed when the power conversion device is controlled in the control device provided in the vehicle.

FIG. 19 is a flowchart showing an example of a flow of a process executed when the power conversion device 31 is controlled by the control device 100 provided in the vehicle 1. The process of the present flowchart is iteratively executed while the vehicle 1 is traveling. The following description focuses on the process of the switching controller 108 provided in the control device 100, i.e., the process in which the switching controller 108 outputs a drive signal to the switching element (step S190 shown in FIG. 10). The process of the other components provided in the control device 100 is performed by the control device 100 and the process up to time t1 shown in (c) of FIG. 15 will be described.

The control device 100 determines whether or not the present control is for driving the traveling motor 10 (step S200). That is, the control device 100 determines whether the present control is control for driving the traveling motor 10 for traveling of the vehicle 1 or control for charging the battery 20 with power generated by the traveling motor 10. When it is determined that the present control is for driving the traveling motor 10 in step S200, the control device 100 starts the control for driving the traveling motor 10 for the traveling of the vehicle 1.

In the control for driving the traveling motor 10 for traveling of the vehicle 1, the control device 100 confirms whether or not a voltage value Vout is a voltage value (0<E1) smaller than that of power E1 of a value of a DC voltage that can be supplied from the battery 20 (step S210). When it is determined that the voltage value Vout is not the voltage value of (0<E1) in step S210, the control device 100 moves the process to step S212.

On the other hand, when it is determined that the voltage value Vout is a voltage value of (0<E1) in step S210, the switching controller 108 generates drive signals for turning off the switching element S11 (the non-conductive state), turning off the switching element S12, turning off the switching element S13, and turning off the switching element S14 (step S211). That is, the switching controller 108 sets the state of control C1 (see (b) in FIG. 15).

The control device 100 confirms whether or not the voltage value Vout is a voltage value (E1=E2) equal to the value of the DC voltage that can be supplied from the battery 20 (step S212). When it is determined that the voltage value Vout is not the voltage value of (E1=E2) in step S212, the control device 100 moves the process to step S214.

On the other hand, when it is determined that the voltage value Vout is the voltage value of (E1=E2) in step S212, the switching controller 108 generates drive signals for turning off the switching element S11, turning off the switching element S12, turning on the switching element S13 (conductive state), and turning off the switching element S14 (step S213). That is, the switching controller 108 sets the state of control C2 (see (b) of FIG. 15).

The control device 100 confirms whether or not the voltage value Vout is a voltage value (Vout≥E1) larger than or equal to the value of the DC voltage that can be supplied from the battery 20 (step S214). When it is determined that the voltage value Vout is not the voltage value of (Vout≥E1) in step S214, the control device 100 moves the process to step S230.

On the other hand, when it is determined that the voltage value Vout is a voltage value of (Vout≥E1) in step S214, the switching controller 108 generates drive signals for turning off the switching element S11, turning on the switching element S12, turning on the switching element S13, and turning off the switching element S14 (step S215). That is, the switching controller 108 sets the state of control C3 (see (b) of FIG. 15). On the other hand, when it is determined that the present control is not for driving the traveling motor 10 in step S200, the control device 100 starts control for charging the battery 20 with the power generated by the traveling motor 10.

In the control for driving the traveling motor 10 for traveling of the vehicle 1, the control device 100 confirms whether or not the voltage value Vout is a voltage value (0<E1) smaller than that of the power E1 of the DC voltage value that can be supplied from the battery 20 (step S220). When it is determined that the voltage value Vout is not the voltage value of (0<E1) in step S220, the control device 100 moves the process to step S222.

On the other hand, when it is determined that the voltage value Vout is a voltage value of (0<E1) in step S220, the switching controller 108 generates drive signals for turning on the switching element S11 (the conductive state), turning off the switching element S12 (the non-conductive state), turning off the switching element S13, and turning off the switching element S14 (step S221). That is, the switching controller 108 sets the state of control C1' (see FIG. 18).

The control device 100 confirms whether or not the voltage value Vout is a voltage value (E1=E2) equal to the value of the DC voltage that can be supplied from the battery 20 (step S222). When it is determined that the voltage value Vout is not the voltage value of (E1=E2) in step S222, the control device 100 moves the process to step S224.

On the other hand, when it is determined that the voltage value Vout is the voltage value of (E1=E2) in step S222, the switching controller 108 generates drive signals for turning on the switching element S11, turning off the switching element S12, turning on the switching element S13, and turning on the switching element S14 (step S223). That is, the switching controller 108 sets the state of control C2' (see FIG. 18).

The control device 100 confirms whether or not the voltage value Vout is a voltage value (Vout≥E1) larger than or equal to the value of the DC voltage that can be supplied from the battery 20 (step S224). When it is determined that the voltage value Vout is not the voltage value of (Vout≥E1) in step S224, the control device 100 moves the process to step S230.

On the other hand, when it is determined that the voltage value Vout is a voltage value of (Vout≥E1) in step S224, the switching controller 108 generates drive signals for turning off the switching element S11, turning off the switching element S12, turning on the switching element S13, and turning off the switching element S14 (step S225). That is, the switching controller 108 sets the state of control C3' (see FIG. 18).

The switching controller 108 outputs the generated drive signals to the corresponding switching elements S (step S230). The control device 100 ends the present process and iterates the process again from step S100 shown in FIG. 10.

According to such a flow of a process, the control device 100 generates and outputs a drive signal for turning on each switching element S (the conductive state) or turning off each switching element S (the non-conductive state) on the basis of a voltage value of the voltage value Vout. Thereby, the power conversion device 31 operates in accordance with the control process of the control device 100 and supplies the power for traveling of the vehicle 1 to the traveling motor 10 or causes the battery 20 to be charged with the power generated by the traveling motor 10.

Modified Example of Second Embodiment

A configuration in which power whose voltage waveform has half-waves of sinusoidal waves is supplied to the load LD side with a voltage value Vout, which is three times or more the DC voltage value, by stacking a configuration similar to that of the voltage waveform generator 31VG will be described.

Figure 20:
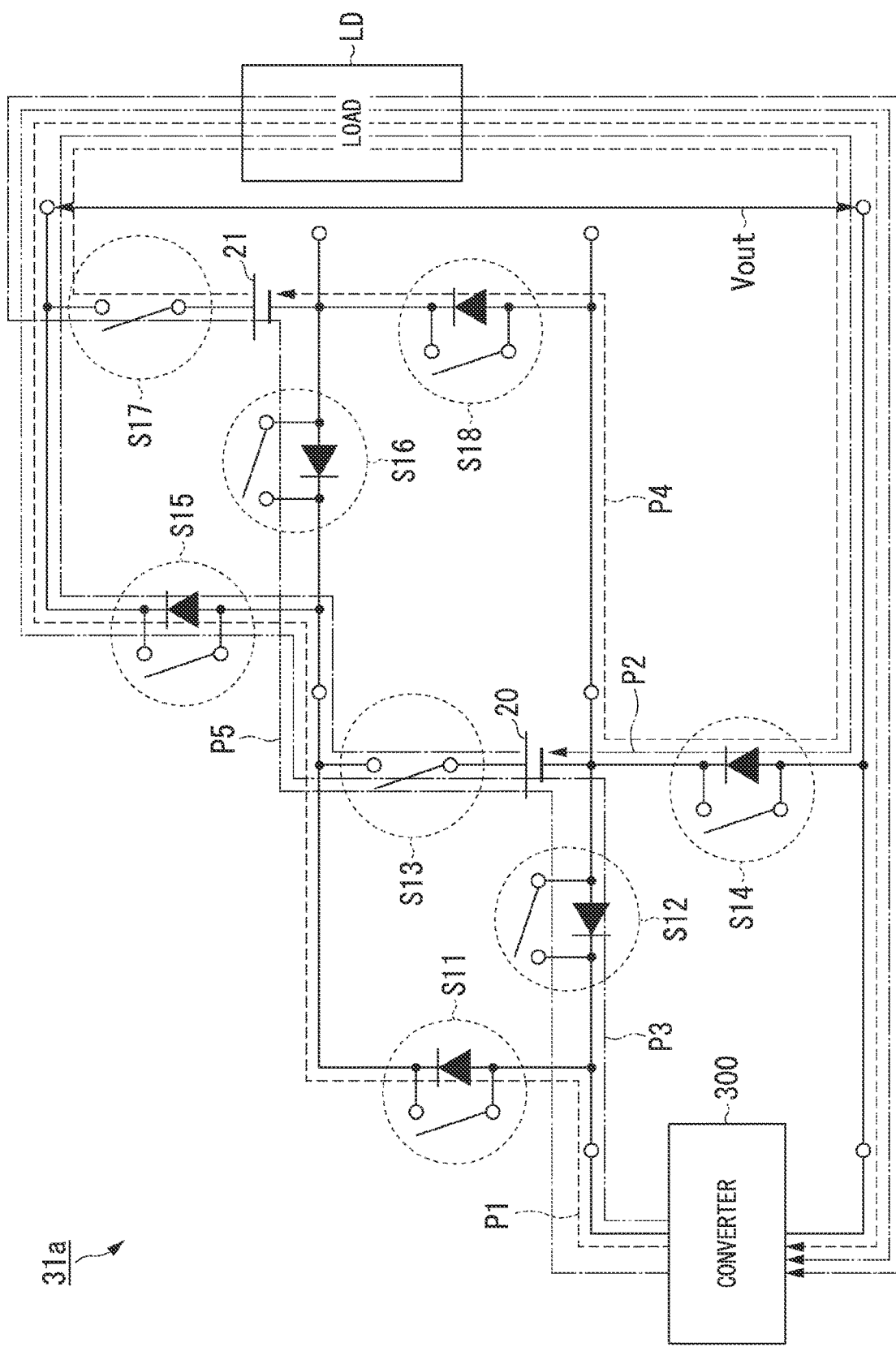
FIG. 20 is a diagram showing an example of a configuration of a modified example of the power conversion device according to the second embodiment.

FIG. 20 is a diagram showing an example of a configuration of a modified example of the power conversion device 31 according to the second embodiment. The power conversion device 31 of the modified example shown in FIG. 20 is also a power conversion device 31 corresponding to any one of the U-phase, the V-phase, and the W-phase of the three-phase AC in the traveling motor 10 provided in the vehicle 1. The power conversion device 31 of the modified example (hereinafter referred to as a "power conversion device 31a") includes, for example, a converter 300 and eight switching elements (switching elements S11 to S18). In the power conversion device 31a, the four switching elements S of the switching elements S11 to S14 are a voltage waveform generator 31VG corresponding to the battery 20 and the four switching elements S of the switching elements S15 to S18 are a voltage waveform generator 31VG corresponding to a battery 20 (hereinafter referred to as a "battery 21") different from the battery 20. In FIG. 20, the battery 20 and the load LD (including the switching elements S1 to S4) related to the power conversion device 31a are also shown. Further, in FIG. 20, a current path P along which a current flows through the load LD when the power conversion device 31a supplies power in accordance with the control process of the control device 100 for the switching element S is shown. The control process of the control device 100 and the current path P will be described below.

The battery 21 is similar to the battery 20. The battery 21 is discharged (supplied) to supply DC power of a DC voltage value that is the same as that of the battery 20 or is charged with the DC power. The battery 21 is an example of a "second battery" in the claims and the power supplied when the battery 21 is discharged is an example of "second battery power" in the claims.

The switching element S15 is a switching element S having a function similar to that of the switching element S11. The switching element S15 limits a direction in which power output from the converter 300 and/or the battery 20 is supplied, for example, in accordance with the control process of the control device 100.

The switching element S16 is a switching element S having a function similar to that of the switching element S12. The switching element S16 limits a direction in which output power output from the converter 300 and/or the battery 20 is supplied, for example, in accordance with the control process of the control device 100.

The switching element S17 is a switching element S having a function similar to that of the switching element S13. The switching element S17 switches a connection between the positive electrode side and the load LD side of the battery 21. The control device 100 alternately controls the switching element S17 so that the switching element S17 is in the conductive state and the non-conductive state and therefore the power conversion device 31a can supply power (output power E3) whose voltage waveform based on the DC power supplied when the battery 21 is discharged is rectangular to the load LD side. The switching element S17 is an example of a "third generator" in the claims and the output power E3 output by the switching element S17 is an example of "fifth output power" in the claims.

The switching element S18 is a switching element S having a function similar to that of the switching element S14. The switching element S18 limits a direction of the power supplied to the negative electrode side of the battery 20, for example, in accordance with the control process of the control device 100.

Although an example of a case where each of the switching element S11, the switching element S12, the switching element S14, the switching element S15, the switching element S16, and the switching element S18 includes a diode and a switch is shown in FIG. 20, a configuration in which a field-effect transistor FET or a diode D and an insulated gate bipolar transistor IGBT are provided may be adopted as in the switching element S5 provided in the power conversion device 30 of the first embodiment (see FIG. 4). Further, although an example in which the switching element S13 and the switching element S17 include a switch is shown in FIG. 20, a configuration in which two field-effect transistors FET are connected in series or a configuration in which two switching elements each having a diode D and an insulated gate bipolar transistor IGBT are connected in series may be adopted (see FIG. 14), in the same manner as the power conversion device 31.

In the power conversion device 31a, the connection between the battery 20 and the converter 300 is switched to the series connection or the parallel connection according to the configuration of the switching element S11, the switching element S12, the switching element S13, and the switching element S14. Further, in the power conversion device 31a, the connection between the battery 21 and the converter 300 and/or the battery 20 can be switched to the series connection or the parallel connection according to the configuration of the switching element S15, the switching element S16, the switching element S17, and the switching element S18. The configuration of the switching element S15, the switching element S16, the switching element S17, and the switching element S18 is an example of a "fourth switching element" in the claims.

[Voltage Waveform Generated by Power Conversion Device of Modified Example]

Figure 21:
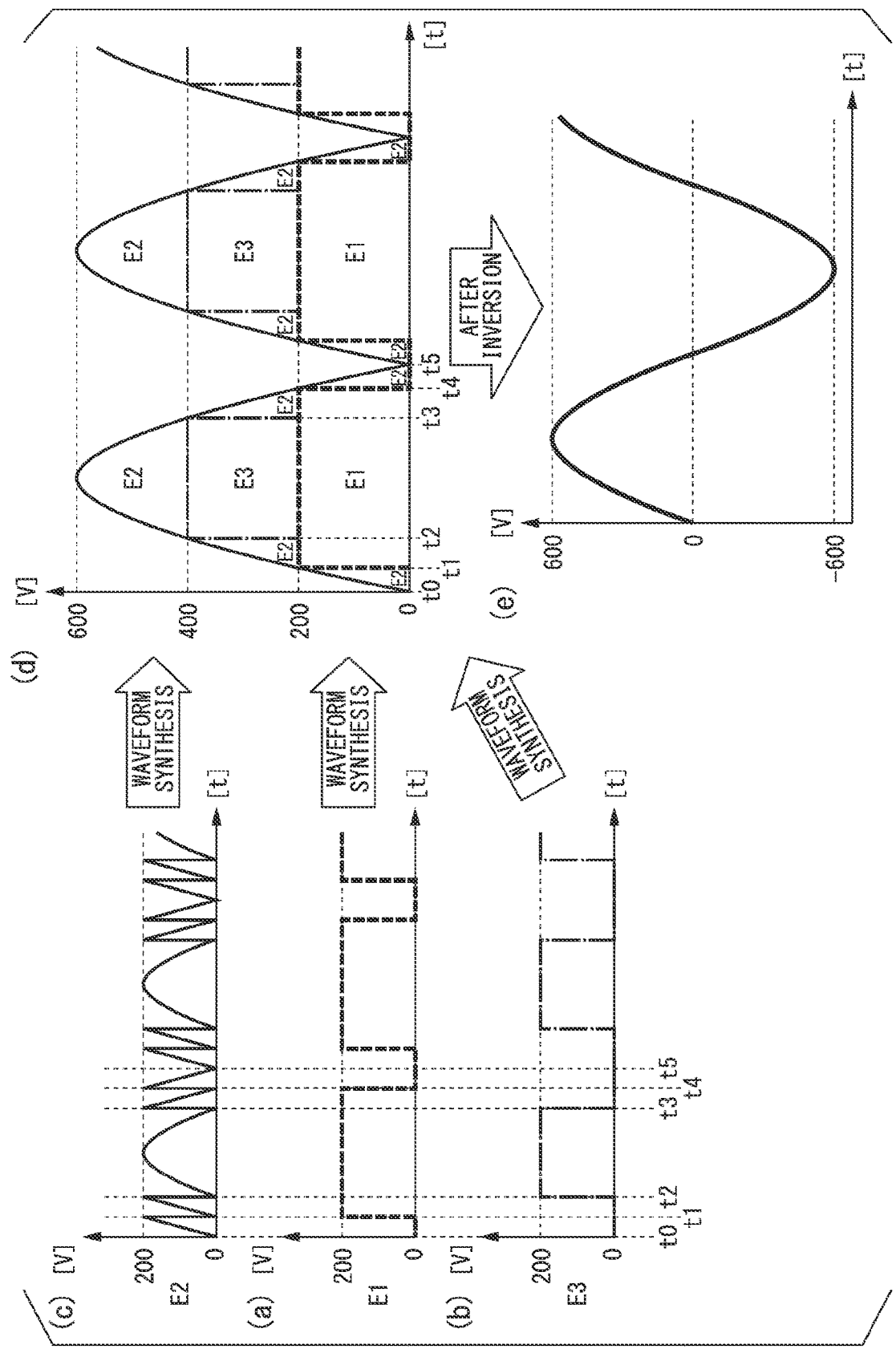
FIG. 21 is a diagram showing an example of a voltage waveform generated in the power conversion device of the modified example.

FIG. 21 is a diagram showing an example of a voltage waveform generated by the power conversion device 31a of the modified example. In FIG. 21, an example of a state in which a voltage waveform of power output by the power conversion device 31a is subjected to a waveform synthesis process in accordance with a control process of the control device 100 when a value of a DC voltage supplied (discharged) from the battery 20 is 200 [V] is schematically shown.

The power conversion device 31a generates power E1 having a rectangular waveform having a frequency for driving the traveling motor 10 which is the load LD, as shown in (a) of FIG. 21, in accordance with the control process of the control device 100. More specifically, the control device 100 controls each switching element S so that the power E1 having a rectangular waveform in which the voltage value becomes 0 [V] during a period from time t0 to time t1, a DC voltage value is held when the battery 20 is discharged during a period from time t1 to time t4, and the voltage value becomes 0 [V] during a period from time t4 to time t5 is generated.

The power conversion device 31a generates output power E3 having a rectangular waveform whose phase is different at the frequency for driving the traveling motor 10, as shown in (b) of FIG. 21, in accordance with the control process of the control device 100. More specifically, the control device 100 controls each switching element S so that the output power E3 having a rectangular waveform in which the voltage value becomes 0 [V] during a period from time t0 to time t2, a DC voltage value is held when the battery 20 is discharged during a period from time t2 to time t3, and the voltage value becomes 0 [V] during a period from time t3 to time t5 is generated.

In the power conversion device 31a, when the operation of the converter 300 is started by the control device 100, the converter 300 generates and outputs the output power E2 of the voltage waveform as shown in (c) of FIG. 21 on the basis of an output waveform profile input or set by the control device 100. The output waveform profile input to or set in the converter 300 by the control device 100 is for generating a voltage waveform obtained by subtracting the voltage waveform of the power E1 and the voltage waveform of the output power E3 from half-waves of sinusoidal waves of a frequency for driving the traveling motor 10. More specifically, the output waveform profile includes nine first to ninth output waveform profiles. The first output waveform profile is a profile for increasing the voltage value of the output power E2 from the state in which the voltage value of the output power E2 is zero along the half-waves of the sinusoidal waves during a period from time t0 to time t1. The second output waveform profile is a profile for setting the voltage value of the output power E2 to zero at time t1 when the voltage value of the output power E2 becomes equal to the DC voltage value. The third output waveform profile is a profile for increasing the voltage value of the output power E2 from the state in which the voltage value of the output power E2 is zero along the half-waves of the sinusoidal waves during a period from time t1 to time t2. The fourth output waveform profile is a profile for setting the voltage value of the output power E2 to zero at time t2 when the voltage value of the output power E2 becomes equal to the DC voltage value. The fifth output waveform profile is a profile for increasing the voltage value of the output power E2 from the state in which the voltage value of the output power E2 is zero as in half-waves of sinusoidal waves during a period from time t2 to time t3 and decreasing the voltage value of the output power E2 from the time when the voltage value of the output power E2 becomes equal to the DC voltage value as in half-waves of sinusoidal waves. The sixth output waveform profile is a profile for making the voltage value of the output power E2 equal to the DC voltage value at time t3 when the voltage value of the output power E2 becomes zero. The seventh output waveform profile is a profile for decreasing the voltage value of the output power E2 from the state in which the voltage value of the output power E2 becomes equal to the DC voltage value to the state in which the voltage value of the output power E2 becomes zero along the half-waves of the sinusoidal waves during a period from time t3 to time t4. The eighth output waveform profile is a profile for making the voltage value of the output power E2 equal to the DC voltage value at time t4 when the voltage value of the output power E2 becomes zero. The ninth output waveform profile is a profile for decreasing the voltage value of the output power E2 from the state in which the voltage value of the output power E2 becomes equal to the DC voltage value to the state in which the voltage value of the output power E2 becomes zero along the half-waves of the sinusoidal waves during a period from time t4 to time t5. The control device 100 causes the output power E2 of the voltage waveform as shown in (c) of FIG. 21 to be output from the converter 300 by sequentially inputting or setting these nine output waveform profiles to or in the converter 300 in accordance with timings for controlling the switching elements S for generating the power E1 and the output power E2.

The control device 100 may use a common output waveform profile in which the voltage waveform of the output power E2 has the same shape. More specifically, the first output waveform profile and the third output waveform profile may be used in common, the second output waveform profile and the fourth output waveform profile may be used in common, the sixth output waveform profile and the eighth output waveform profile may be used in common, or the seventh output waveform profile and the ninth output waveform profile may be used in common. In this case, the control device 100 inputs or sets a common output waveform profile to or in the converter 300 twice, thereby causing the output power E2 of the voltage waveform as shown in (c) of FIG. 21 to be output from the converter 300.

In the power conversion device 31a, a waveform synthesis process is performed for the voltage waveform of the power E1, the voltage waveform of the output power E2, and the voltage waveform of the output power E3 and the voltage value Vout of power whose voltage value (600 [V]

in (d) of FIG. 21) is three times the DC voltage value when the battery 20 is discharged and whose voltage waveform has half-waves of sinusoidal waves as shown in (d) of FIG. 21 is supplied to the load LD. Thereby, even in the power conversion device 31a, the direction of the current flowing through the load LD due to the operation of the switching circuit (the switching operations of the switching elements S1 to S4) is reversed, for example, when the voltage waveform of the power of the voltage value Vout supplied to the load LD has even-numbered half-waves, and power of a voltage waveform of sinusoidal waves (full waves) of a frequency for driving the traveling motor 10 as shown in (e) of FIG. 21 is supplied. Thereby, the traveling motor 10 is driven (rotated) with the supplied power of the sinusoidal waves.

[Operation of Power Conversion Device]

FIG. 22 is a diagram showing an example of control of the power conversion device 31a in the control device 100 provided in the vehicle 1. In (a) of FIG. 22, control for the switching element S when the traveling motor 10 for traveling of the vehicle 1 is driven is shown. In (b) of FIG. 22, control for the switching element S when the battery 20 and the battery 21 are charged with power generated by the traveling motor 10 is shown. Control C shown in FIG. 22 corresponds to each current path P shown in FIG. 20. In this regard, control shown in (b) of FIG. 22 is control for the switching element S for allowing a current to flow in a direction opposite to that of each current path P shown in FIG. 20.

The power conversion device 31a supplies power whose voltage value is three times the DC voltage value when the battery 20 is discharged by performing a waveform synthesis process for the voltage waveform of the power E1, the voltage waveform of the output power E2, and the voltage waveform of the output power E3 and whose voltage waveform has half-waves of sinusoidal waves based on a voltage value=0 [V] to the terminal of the load LD (see (d) of FIG. 21).

Even in the power conversion device 31a, a timing when the control device 100 switches the connection between the battery 20 and the converter 300 is similar to that of the power conversion device 30. That is, even in the power conversion device 31a, a timing when control of the control device 100 is switched from control C1 to control C2 and a timing when control of the control device 100 is switched from control C2 to control C3 are similar to those of the power conversion device 30. A timing when a connection between a series connection between the battery 20 and the converter 300 and the battery 21 is switched in the power conversion device 31a is also similar to that of the power conversion device 30. More specifically, in the power conversion device 31a, a timing when control of the control device 100 is switched from control C3 to control C4 and a timing when control of the control device 100 is switched from control C4 to control C5 are also similar to those of the power conversion device 30. However, in the power conversion device 31a, a timing when control of the control device 100 is switched from control C3 to control C4 and a timing when control of the control device 100 is switched from control C4 to control C5 may be different from those of the power conversion device 30.

Figure 23:
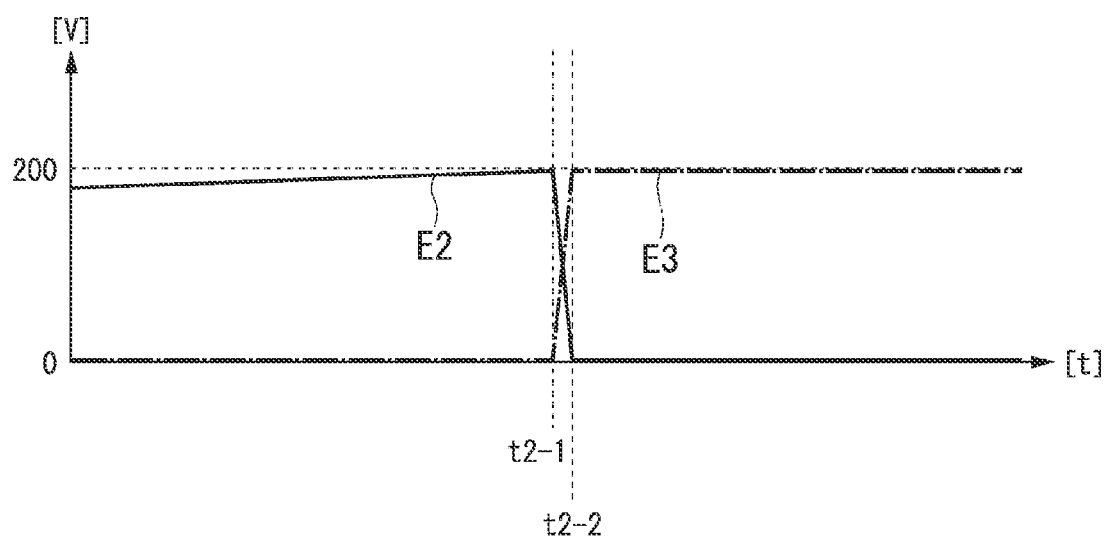
FIG. 23 is a diagram showing an example of detailed timings when the control device provided in the vehicle controls the power conversion device.

FIG. 23 is a diagram showing an example of detailed timings when the control device 100 provided in the vehicle 1 controls the power conversion device 31a. In FIG. 23, an example of a state of a change in a voltage waveform at a timing (time t2 of FIG. 21) at which the connection between the series connection between the battery 20 and the converter 300 and the battery 21 is switched from the parallel connection to the series connection when a waveform synthesis process is performed for the voltage waveform of the power that is supplied to the load LD is shown.

The control device 100 switches control for the switching element S from control C3 to control C4 at a timing of time t2-1 when the voltage value of the output power E2 becomes a voltage value equal to a value of a DC voltage that can be supplied from the battery 20. Thereby, the output of the output power E3 based on the DC power is started from the battery 21. Subsequently, the control device 100 switches control for the switching element S from control C4 to control C5 at a timing of time t2-2 when the voltage value of the output power E2 becomes zero.

In this way, the control device 100 switches the connection between the series connection between the battery 20 and the converter 300 and the battery 21 from the parallel connection to the series connection without causing the voltage waveform of the output power E2 to overlap the voltage waveform of the output power E3 for a short period of time as shown in FIG. 17. Thereby, after the control device 100 switches control for the switching element S from control C4 to control C5 at the timing of time t2-2, the output power E3 is further added to power obtained by adding the power E1 to the output power E2 as the voltage waveform of the output power E2 increases as in the half-waves of the sinusoidal waves (see (d) of FIG. 21).

The control device 100 may use control timings shown in FIG. 23 as control timings when switching from control C1 to control C2 and switching from control C2 to control C3 are performed.

It is only necessary for other operations in the power conversion device 31a to be equivalent to the operations of the power conversion device 31 described with reference to FIGS. 15 to 19. Thus, a detailed description of the operations of the power conversion device 31a will be omitted.

According to such a configuration and control, the power conversion device 31 (including the power conversion device 31a) can perform conversion into AC power obtained by boosting the voltage of the DC power supplied (discharged) from the battery 20 by a factor of 2 (a factor of 3 in the power conversion device 31a) in accordance with a control process of the control device 100 and supply the AC power to the traveling motor 10 as in the power conversion device 30 (including the power conversion device 30a) of the first embodiment. Even in this case, like the power conversion device 30 (including the power conversion device 30a) of the first embodiment, the power conversion device 31 (including the power conversion device 31a) can perform power conversion in which the deterioration of the power conversion efficiency, the increase in the loss due to the use of a high withstand voltage component, and the deterioration of the component are limited as compared with the power conversion device using the conventional inverter. That is, the power conversion device 31 (including the power conversion device 31a) can also perform power conversion more efficiently than the power conversion device using the conventional inverter.

In the modified example of the second embodiment described above, a case where the voltage of the DC power of the battery 20 is boosted three times according to the configuration in which the voltage waveform generator 31VG including the battery 21 is added (stacked) has been described. Likewise, in the power conversion device 31, by stacking the voltage waveform generator 31VG including a battery different from the battery 20 and the battery 21, it is possible to further increase a multiple by which the voltage of the DC power of the battery 20 is boosted (set the multiple to a factor of 4 or more). In this case, it is only necessary for the configuration, operation, process, and the like of the power conversion device 31 to be equivalent to the configuration, operation, and process of the above-described power conversion device 31a.

Third Embodiment

[Configuration of Power Conversion Device]

Figure 24:
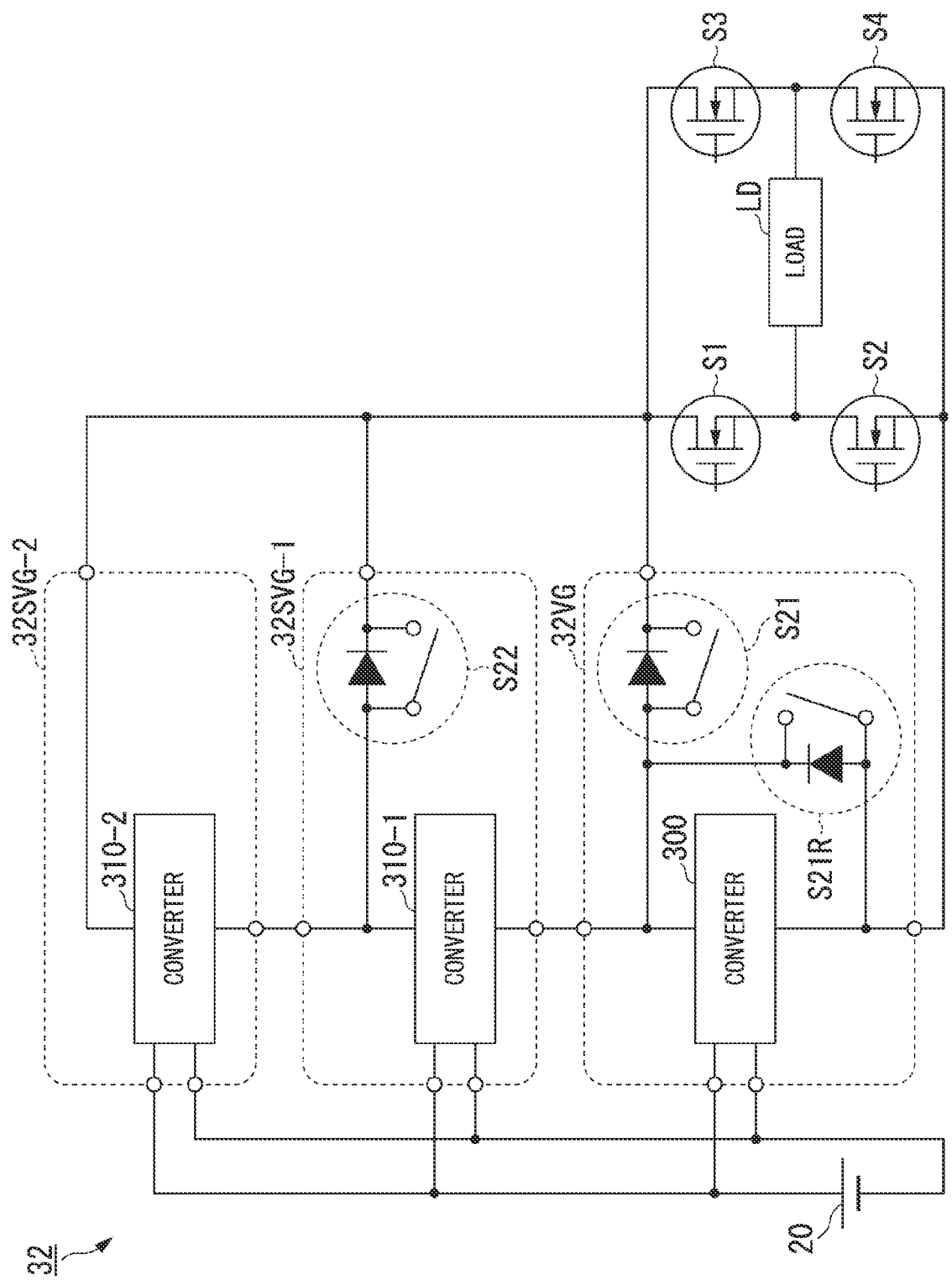
FIG. 24 is a diagram showing an example of a configuration of a power conversion device according to a third embodiment.

FIG. 24 is a diagram showing an example of a configuration of a power conversion device according to a third embodiment. The power conversion device of the third embodiment shown in FIG. 24 (hereinafter referred to as a "power conversion device 32") is also similar to the power conversion device 30 of the first embodiment or the power conversion device 31 of the second embodiment and is a power conversion device corresponding to one of a U-phase, a V-phase, and a W-phase of a three-phase AC in a traveling motor 10 provided in the vehicle 1. In FIG. 24, a battery 20 and a load LD related to the power conversion device 32 are also shown. Switching elements S1 to S4 shown in FIG. 24 have a configuration corresponding to a single-phase converter 30PC in the power conversion device 30 of the first embodiment. Although the switching element S1 and the switching element S2 are shown as components having a configuration corresponding to the single-phase converter 30PC in the power conversion device 30 of the first embodiment in FIG. 24, the switching element S1 and the switching element S2 are also components belonging to the power conversion device 32.

The power conversion device 32 also generates a half-wave voltage waveform of sinusoidal waves on the basis of the DC power supplied (discharged) from the battery 20. The configuration of the power conversion device 32 shown in FIG. 24 is a configuration in which the load LD side is supplied with power whose voltage waveform has half-waves of sinusoidal waves with a voltage value that is three times the DC voltage value when the battery 20 is discharged. The power conversion device 32 includes, for example, a voltage waveform generator 32VG, a rectangular voltage generator 32SVG-1, and a rectangular voltage generator 32SVG-2. The voltage waveform generator 32VG includes, for example, a converter 300, a switching element S21, and a switching element S21R. The rectangular voltage generator 32SVG-1 includes, for example, a converter 310-1 and a switching element S22. The rectangular voltage generator 32SVG-2 includes, for example, a converter 310-2.

The voltage waveform generator 32VG generates a half-wave voltage waveform of sinusoidal waves on the basis of the DC power supplied (discharged) from the battery 20. The voltage waveform generator 32VG has a configuration corresponding to the voltage waveform generator 30VG in the power conversion device 30 of the first embodiment or the voltage waveform generator 31VG in the power conversion device 31 of the second embodiment.

The switching element S21 limits a direction in which the output power output from the converter 300 is supplied, for example, in accordance with the control process of the control device 100. The switching element S21 corresponds to the switching element S5 provided in the power conversion device 30 of the first embodiment or the switching element S11 provided in the power conversion device 31 of the second embodiment. The switching element S21 is an example of a "switching unit" and a "fifth switching element" in the claims.

The switching element S21R switches a connection between the converter 300 and the converter 310-1 and/or the converter 310-2. In FIG. 24, an example of a case where the switching element S21R includes a diode and a switch is shown. When the control device 100 controls the switch provided in the switching element S21R so that the switch is in a non-conductive state, the switching element S21R causes the converter 300 and the converter 310-1 and/or the converter 310-2 to be connected (connected in series). On the other hand, when the control device 100 controls the switch provided in the switching element S21R so that the switch is in a conductive state, the switching element S21R causes the converter 300 and the converter 310-1 and/or the converter 310-2 to be disconnected. The switching element S21R is an example of a "switching unit" and a "sixth switching element" in the claims.

The rectangular voltage generator 32SVG-1 and the rectangular voltage generator 32SVG-2 generate a voltage waveform having a rectangular waveform on the basis of the DC power supplied (discharged) from the battery 20. The rectangular voltage generator 32SVG-1 and the rectangular voltage generator 32SVG-2 generate rectangular waveforms having different timings at which the waveforms change. The rectangular voltage generator 32SVG-1 generates, for example, a rectangular waveform corresponding to the voltage waveform of the power E1 in the second embodiment. The rectangular voltage generator 32SVG-2 generates, for example, a rectangular waveform corresponding to the voltage waveform of the output power E3 in the second embodiment.

The converter 310-1 and the converter 310-2 are converters having the same configuration as the converter 300. However, an output waveform profile different from that of the converter 300 is input to or set in each of the converter 310-1 and the converter 310-2 by the control device 100. More specifically, an output waveform profile for generating a rectangular waveform corresponding to the voltage waveform of the power E1 is input to or set in each of the converter 310-1 by the control device 100 and an output waveform profile for generating a rectangular waveform corresponding to the voltage waveform of the output power E3 is input to or set in each of the converter 310-2 by the control device 100. Each of the converter 310-1 and the converter 310-2 generates and outputs the output power of a corresponding rectangular waveform from the DC power supplied (discharged) from the battery 20 on the basis of the output waveform profile input or set by the control device 100. Each of the converter 310-1 and the converter 310-2 is an example of a "fourth generator" in the claims and the output power of the rectangular waveform output by each of the converter 310-1 and the converter 310-2 is an example of a "sixth output power" in the claims. The converter 310-1 may be an example of a "first generator" in the claims and the output power of the rectangular waveform output by the converter 310-1 may be an example of "second output power" in the claims. In this case, the converter 310-2 may be an example of the "fourth generator" in the claims and the output power of the rectangular waveform output by the converter 310-2 may be an example of the "sixth output power" in the claims.

Each of the converter 310-1 and the converter 310-2 is not limited to the converter having the same configuration as the converter 300. That is, even if each of the converter 310-1 and the converter 310-2 does not have a configuration in which the output power of the voltage waveform based on the output waveform profile input or set by the control device 100 is output, any configuration may be used as long as it can output the output power of a rectangular waveform corresponding to the voltage waveform of the power E1 or the output power E3. For example, each of the converter 310-1 and the converter 310-2 may be a bridge or push-pull type bidirectional isolated DC-DC converter that is configured in advance so that the voltage waveform of the output power to be output is a rectangular waveform corresponding to the voltage waveform of the power E1 or the output power E3. For example, each of the converter 310-1 and the converter 310-2 may be a switching circuit for performing a switching operation so that the voltage waveform of the output power that outputs the DC power supplied (discharged) from the battery 20 becomes a rectangular waveform corresponding to the voltage waveform of the power E1 or the output power E3. In this case, each of the converter 310-1 and the converter 310-2 may include another battery similar to the battery 20 and configured to be discharged (supplied) or charged with DC power of a DC voltage value that is the same as that of the battery 20 and have a configuration for performing a switching operation with respect to the DC power supplied (discharged) from the battery 20. The configuration in this case may correspond to the configuration of the battery 20 and the switching element S13 in the power conversion device 31 (which may be the power conversion device 31a) of the second embodiment or the configuration of the battery 21 and the switching element S17.

The switching element S22 limits a direction in which the output power output from the converter 310-1 is supplied, for example, in accordance with the control process of the control device 100. The switching element S22 corresponds to the switching element S5 provided in the power conversion device 30 of the first embodiment, the switching element S6 provided in the power conversion device 30a of the modified example of the first embodiment, the switching element S11 provided in the power conversion device 31 of the second embodiment, or the switching element S15 provided in the power conversion device 31a of the modified example of the second embodiment. The switching element S22 is an example of a "switching unit" and a "seventh switching element" in the claims.

Although an example of a case where each of the switching element S21, the switching element S21R, and the switching element S22 includes a diode and a switch is shown in FIG. 24, each of the switching element S21, the switching element S21R, and the switching element S22 may include a field-effect transistor FET or a diode D and an insulated gate bipolar transistor IGBT as in the switching element S5 provided in the power conversion device 30 of the first embodiment, the switching element S11 provided in the power conversion device 31 of the second embodiment, or the like (see FIG. 4).

A case where the voltage waveform generator 32VG, the rectangular voltage generator 32SVG-1, and the rectangular voltage generator 32SVG-2 have different configurations is shown in FIG. 24. That is, a configuration in which the voltage waveform generator 32VG includes a switching element S21 and a switching element S21R, the rectangular voltage generator 32SVG-1 includes a switching element S22, and the rectangular voltage generator 32SVG-2 does not include any switching element is shown. However, for example, when all the converter 300, the converter 310-1, and the converter 310-2 have a configuration in which the output power of the voltage waveform based on the output waveform profile input or set by the control device 100 is output, the voltage waveform generator 32VG, the rectangular voltage generator 32SVG-1, and the rectangular voltage generator 32SVG-2 may have the same configuration. In this case, it is only necessary to adopt a configuration in which it is possible to switch between whether or not to use each of the switching element S21 and the switching element S21R. For example, when both the converter 310-1 and the converter 310-2 have the same configuration (a configuration including a switching circuit or a battery different from the battery 20), the rectangular voltage generator 32SVG-1 and the rectangular voltage generator 32SVG-2 may have the same configuration. In this case, it is only necessary to adopt a configuration in which it is possible to switch between whether or not to use the switching element S22. The configuration in which it is possible to switch between whether or not to use each switching element S may be, for example, a mechanical configuration or an electrical configuration for bypassing the unused switching element S.

[Operation of Power Conversion Device]

Here, an example of a control process of the control device 100 for the power conversion device 32 and an operation of the power conversion device 32 will be described. FIG. 25 is a diagram showing an example in which the control device 100 provided in the vehicle 1 controls the power conversion device 32. In (a) of FIG. 25, control C for the converter 300, the converter 310-1, the converter 310-2, and the switching element S when the traveling motor 10 for traveling of the vehicle 1 is driven is shown. In (b) of FIG. 25, control C' for the converter 300, the converter 310-1, the converter 310-2, and the switching element S when the battery 20 and the battery 21 are charged with the power generated by the traveling motor 10 is shown. In FIG. 25, "OP" denotes control that is performed for the converter 300, the converter 310-1, or the converter 310-2 so that they are in an operating state and "NOP" denotes control that is performed for the converter 300, the converter 310-1, or the converter 310-2 so that they are in a non-operating state. In FIG. 25, as the description in "( ): parentheses" in "OP" of the converter 300, "UP" denotes a state in which a change is made so that the voltage value of the output power E2 output by the converter 300 increases (including an intermediate state), "Max" denotes a state in which the voltage value of the output power E2 output by the converter 300 becomes a maximum value, and "0V" denotes a state in which the voltage value of the output power E2 output by the converter 300 becomes zero. On the other hand, in FIG. 25, because the converter 300 generates the output power of the voltage waveform as shown in (c) of FIG. 21, whereas the converter 310-1 and the converter 310-2 generate and output the output power of the rectangular voltage waveform as shown in (a) and (b) of FIG. 21, the operating state in which power whose voltage value is a maximum value is denoted by "OP" and the non-operating state in which power whose voltage value is zero denoted by "NOP." In FIG. 25, "ON" indicates that the switching element S is controlled so that it is in the conductive state, "OFF" indicates that the switching element S is controlled so that it is in the non-conductive state, "↑: upward arrow" indicates that the control for the switching element S is not changed, and the description in "( ): parentheses" indicates a component flowing through the switching element S.

An example of a voltage waveform generated in the power conversion device 32 and an example of a state of waveform synthesis of voltage waveforms are similar to an example of a voltage waveform generated in the power conversion device 31a of the modified example of the second embodiment shown in FIG. 21 and an example of a state of waveform synthesis of voltage waveforms. More specifically, in the power conversion device 32, the converter 300 generates and outputs the output power E2 of the voltage waveform as shown in (c) of FIG. 21 from the DC power supplied (discharged) from the battery 20 (hereinafter referred to as "DC power E"), the converter 300-1 generates and outputs the power E1 of the voltage waveform as shown in (a) of FIG. 21, and the converter 300-2 generates and outputs the output power E3 of the voltage waveform as shown in (b) of FIG. 21.

Figure 26:
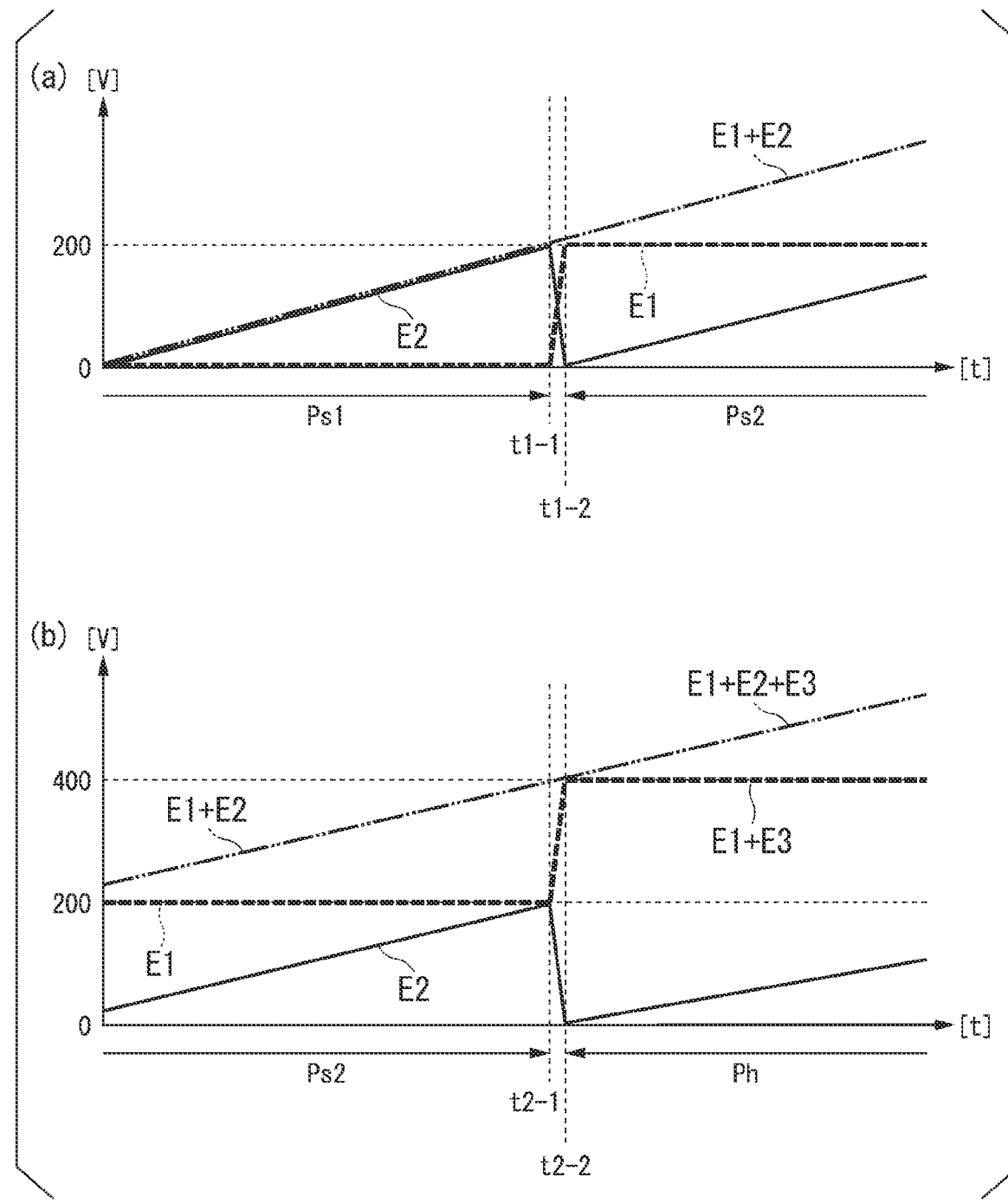
FIG. 26 is a diagram showing an example of detailed timings when a control device provided in the vehicle controls the power conversion device.

FIG. 26 is a diagram showing an example of detailed timings when the control device 100 provided in the vehicle 1 controls the power conversion device 32. In FIG. 26, an example of a state of a change in a voltage waveform at a timing when the connection between the converter 300 and the converter 310-1 and/or the converter 310-2 is switched when a waveform synthesis process is performed for the voltage waveform of the power supplied to the load LD is shown. In (a) of FIG. 26, an example of a state of a change in the voltage waveform when a waveform synthesis process is performed for the voltage waveform of the output power E2 output by the converter 300 and the voltage waveform of the power E1 output by the converter 310-1 is shown. In (b) of FIG. 26, an example of a state of a change in the voltage waveform when a waveform synthesis process is performed for the voltage waveform of the output power E3 output by the converter 310-2 is shown. In the following description, an operation when the power conversion device 32 supplies power to the load LD side will be described with reference to FIG. 21 as appropriate in addition to (a) of FIG. 25 and FIG. 26.

The control device 100 controls each component provided in the power conversion device 32 as in the stage of control C1 shown in (a) of FIG. 25 at time t0 shown in FIG. 21, i.e., when the voltage value Vout of the power supplied to the load LD is smaller than the DC voltage value of the DC power E supplied from the battery 20. Thereby, in the power conversion device 32, the output power E2 that increases along the half-waves of the sinusoidal waves output by the converter 300 during a period from time t0 to time t1 is supplied to the load LD side through the diode D of the switching element S21 (see (d) of FIG. 21). Thereby, the voltage value Vout of the power supplied to the load LD becomes the voltage value of the output power E2.

Subsequently, when the voltage value of the output power E2 output by the converter 300 increases to the maximum value, i.e., when the voltage value Vout increases to a voltage value equal to the DC voltage value of the DC power E, at time t1 shown in FIG. 21, the control device 100 controls each component provided in the power conversion device 32 as in the stage of control C2 shown in (a) of FIG. 25. That is, the control device 100 is allowed to operate the converter 310-1. Thereby, in the power conversion device 32, the power E1 having a rectangular waveform output by the converter 310-1 is output through the diode D provided in the switching element S22 and power obtained by performing a waveform synthesis process for the voltage waveform of the power E1 and the voltage waveform of the output power E2 is supplied to the load LD side (see (d) of FIG. 21).

Here, detailed timings when a waveform synthesis process is performed for the voltage waveform of the power E1 and the voltage waveform of the output power E2 will be described with reference to (a) of FIG. 26. The control device 100 causes the converter 310-1 to operate at the timing of time t1-1 when the voltage value of the output power E2 becomes a voltage value equal to the DC voltage value of the DC power E. Thereby, the converter 310-1 starts the output of the power E1 based on the DC power E. When a current flows through the diode D of the switching element S21R from time t1-1 to time t1-2 and the voltage value of the output power E2 is smaller than the voltage value of the power E1, a reverse bias is applied to the diode D provided in the switching element S21 and the switching element S21 is turned off (the non-conductive state). In the power conversion device 32, a waveform synthesis process is performed for the voltage waveform of the power E1 and the voltage waveform of the output power E2 and the supply of power obtained by combining the power E1 and the output power E2 to the load LD side is started from the timing of time t1-2 when the voltage value of the output power E2 becomes zero. In this way, in the power conversion device 32, a waveform synthesis process is performed for the voltage waveform of the output power E2 and the voltage waveform of the power E1. In the power conversion device 32, during a period from time t1 to time t2, the power E1 output by the converter 310-1 is combined with the output power E2 increasing along the half-waves of the sinusoidal waves output by the converter 300 and the combined power is supplied to the load LD side. Thereby, the voltage value Vout of the power supplied to the load LD increases to a voltage value that is twice the DC voltage value of the battery 20.

Subsequently, when the voltage value of the output power E2 output by the converter 300 increases to the maximum value, i.e., when the voltage value Vout increases to a voltage value equal to a DC voltage value that is twice that of the DC power E, at time t2 shown in FIG. 21, the control device 100 controls each component of the power conversion device 32 as in the stage of control C3 shown in (a) of FIG. 25. That is, the control device 100 causes the converter 310-2 to operate. Thereby, in the power conversion device 32, the output power E3 having a rectangular waveform is output from the converter 310-2 and power obtained by further performing a waveform synthesis process for a waveform obtained by synthesizing the voltage waveform of the power E1 with the voltage waveform of the output power E2 and the voltage waveform of the output power E3 is supplied to the load LD side (see (d) of FIG. 21).

Here, detailed timings when a waveform synthesis process is further performed for the waveform obtained by synthesizing the voltage waveform of the power E1 with the voltage waveform of the output power E2 and the voltage waveform of the output power E3 will be described with reference to (b) of FIG. 26. The control device 100 causes the converter 310-2 to operate at a timing of time t2-1 when the voltage value of the output power E2 becomes equal to the DC voltage value of the DC power E again. Thereby, the converter 310-2 starts the output of the output power E3 based on the DC power E. When a current flows through the diode D of the switching element S21R from time t2-1 to time t2-2 and the voltage value of the output power E2 becomes smaller than the voltage value of the power E1, a reverse bias is applied to the diode D provided in the switching element S21 and the switching element S21 is turned off (the non-conductive state). Further, a reverse bias is applied to the diode D provided in the switching element S22 and the switching element S22 is also turned off (non-conductive state). In the power conversion device 32, a waveform synthesis process is further performed for the waveform obtained by synthesizing the voltage waveform of the power E1 and the voltage waveform of the output power E2 and the voltage waveform of the output power E3 and the supply of power obtained by combining the power E1, the output power E2, and the output power E3 to the load LD side is started from the timing of time t2-2 when the voltage value of the output power E2 becomes zero. In this way, in the power conversion device 32, a waveform synthesis process is further performed for the waveform obtained by synthesizing the voltage waveform of the power E1 and the voltage waveform of the output power E2 and the voltage waveform of the output power E3. In the power conversion device 32, during the period from time t2 to time t3, the output power E2 increasing along the half-waves of the sinusoidal waves output by the converter 300 is combined with power obtained by combining the power E1 output by the converter 310-1 and the output power E3 output by the converter 310-2 and the combined power is supplied to the load LD side. Thereby, the voltage value Vout of the power supplied to the load LD increases to a voltage value that is three times the DC voltage value of the battery 20 and then decreases.

Subsequently, the control device 100 causes the operation of the converter 310-2 to stop at time t3 shown in FIG. 21 and causes the operation of the converter 310-2 to stop at time t4 shown in FIG. 21. Thereby, the power supplied to the load LD side decreases along the half-waves of the sinusoidal waves output by the converter 300. In this case, it is only necessary for the operation of the power conversion device 32 to be equivalent to the reverse of the operation of the power conversion device 32 described with reference to FIGS. 25 and 26. Accordingly, a detailed description will be omitted. Similar control is iterated from time t5 shown in FIG. 21, i.e., from the next time to.

According to this control process of the control device 100, the power conversion device 32 supplies the load LD with power whose voltage waveform has half-waves of sinusoidal waves based on voltage value=0 [V] at the voltage value that is three times the DC voltage value of the battery 20 as shown in (d) of FIG. 21.

Likewise, the control device 100 performs a control process even if the battery 20 is charged with power generated by the traveling motor 10 operating as a regenerative brake. It is only necessary for the operation of the power conversion device 32 in this case to be equivalent to the reverse of the operation of driving the traveling motor 10 for traveling of the vehicle 1 described with reference to FIGS. 25 and 26. Accordingly, a detailed description will be omitted.

According to such a configuration and control, the power conversion device 32 can perform conversion into AC power obtained by boosting the voltage of the DC power supplied (discharged) from the battery 20 by a factor of 3 in accordance with a control process of the control device 100 and supply the AC power to the traveling motor 10 as in the power conversion device 30 (more specifically, the power conversion device 30a) of the first embodiment or the power conversion device 31 (more specifically, the power conversion device 31a) of the second embodiment. Even in this case, like the power conversion device 30 (including the power conversion device 30a) of the first embodiment or the power conversion device 31 (including the power conversion device 31a) of the second embodiment, the power conversion device 32 can perform power conversion in which the deterioration of the power conversion efficiency, the increase in the loss due to the use of a high withstand voltage component, and the deterioration of the component are limited as compared with the power conversion device using the conventional inverter. That is, the power conversion device 32 can also perform power conversion more efficiently than the power conversion device using the conventional inverter.

Modified Example of Third Embodiment

A configuration in which the above-described power conversion device 32 supplies the load LD side, i.e., the traveling motor 10, with power whose voltage waveform has half-waves of sinusoidal waves with a voltage value that is three times the DC voltage value when the battery 20 is discharged has been described. More specifically, a case in which the power conversion device 32 boosts the voltage of the DC power E of the battery 20 by a factor of 3 according to a configuration in which the voltage waveform generator 32VG, the rectangular voltage generator 32SVG-1, and the rectangular voltage generator 32SVG-2 are stacked has been described. However, the power conversion device 32 can also implement a configuration in which the power supplied to the traveling motor 10 is twice or four times or more the DC power E. In this case, for example, when the power conversion device 32 is configured to boost the power supplied to the traveling motor 10 to power that is twice the DC power E, it is only necessary to omit the rectangular voltage generator 32SVG-1 and it is only necessary for the converter 310-2 provided in the rectangular voltage generator 32SVG-2 to output the power E1 of the voltage waveform as shown in (a) of FIG. 16. It is only necessary for the voltage waveform generator 32VG to output the output power E2 of the voltage waveform as shown in (b) of FIG. 16. For example, when the power conversion device 32 is configured to boost the power supplied to the traveling motor 10 to power that is four times the DC power E, it is only necessary for the voltage waveform generator 32VG and each rectangular voltage generator 32SVG to output required output power of a voltage waveform by adding the rectangular voltage generator 32SVG having a configuration similar to that of the rectangular voltage generator 32SVG-1 in association with the rectangular voltage generator 32SVG-2. Likewise, in the power conversion device 32, by stacking the rectangular voltage generator 32SVG having a configuration similar to that of the rectangular voltage generator 32SVG-1, it is possible to further increase a multiple by which the voltage of the DC power of the battery 20 is boosted (set the multiple to a factor of 5 or more). In this case, it is only necessary for the operation, process, and the like of the power conversion device 32 to be equivalent to the operation, process, and the like of the above-described power conversion device 32.

As described above, according to the power conversion device of each embodiment, the power E1 having a rectangular waveform of a frequency for driving the traveling motor 10 based on the DC power output by the battery 20 is generated and the output power E2 of the voltage waveform obtained by subtracting the voltage waveform of the power E1 from the half-waves of the sinusoidal waves of the frequency for driving the traveling motor 10 is generated. The power conversion device of each embodiment generates half-wave power of sinusoidal waves based on voltage value=0 [V] having the frequency for driving the traveling motor 10 by performing a waveform synthesis process for the voltage waveform of the power E1 and the voltage waveform of the output power E2. Subsequently, the power conversion device of each embodiment performs conversion into full-wave AC power of sinusoidal waves of the frequency for driving the traveling motor 10 by inverting even-numbered half-waves of the sinusoidal waves that have been generated and supplies the AC power to the traveling motor 10. Thereby, the power conversion device of each embodiment can efficiently perform power conversion in which the deterioration of the power conversion efficiency, the increase in the loss due to the use of a high withstand voltage component, and the deterioration of the component are limited as compared with the power conversion device using the conventional inverter.

According to each embodiment that has been described, a power conversion device includes the converter 300 configured to convert at least DC power output by the battery 20 into output power E2 of a voltage waveform (a voltage waveform obtained by subtracting a voltage waveform of power E1 output by a switching circuit from half-waves of sinusoidal waves of a frequency for driving the traveling motor 10) based on an output waveform profile that has been input or set and output the first output power; and the switching circuit (the switching elements S1 to S4) configured to generate and output the power E1 based on the DC power, wherein AC power of sinusoidal waves (full waves) having an AC control waveform generated by adding the output power E2 to the power E1 is supplied to the traveling motor 10 that is the load LD, so that it is possible to preferably perform the power conversion of the battery 20 suitable for the traveling characteristics of the vehicle 1. Thereby, when DC power is converted into AC power, the power conversion device of each embodiment can limit the deterioration of the conversion efficiency, the increase in the loss due to the use of a high withstand voltage component, and the deterioration of the component as compared with the power conversion device using the conventional inverter and efficiently perform power conversion. Thereby, in the vehicle 1 equipped with the power conversion device of each embodiment, the mileage can be extended, the durability can be improved, and the commercial value of the vehicle 1 can be enhanced.

In each of the above-described embodiments, the configuration in which the control device 100 provided in the vehicle 1 controls the operation of the power conversion device has been described. That is, in each of the above-described embodiments, the case where the control device for controlling the operation of the power conversion device is configured within the control device 100 provided in the vehicle 1 has been described. However, the control device that controls the operation of the power conversion device may be a component provided in the power conversion device. In this case, the control device provided in the power conversion device can control an operation of the power conversion device of each embodiment that has been described, for example, by acquiring the battery information output by the battery sensor 22, the output power information output by the power sensor 35, and information of AC power to be supplied to the traveling motor 10 or a command value (a voltage value, a frequency, or the like) obtained by the control device 100 from the control device 100 provided in the vehicle 1. In this case, it is only necessary for the configuration, operation, process, and the like of the power conversion device and the control device to be equivalent to the configuration, operation, and process of the power conversion device or the control device 100 of each of the above-described embodiments.

The embodiment described above can be represented as follows.

A control device for controlling a power conversion device including a first converter configured to convert at least first battery power output by a first battery into first output power of a first voltage waveform based on an output waveform profile that has been input or set and output the first output power and a first generator configured to generate and output second output power based on the first battery power, the control device including:

a hardware processor, and a storage device storing a program, wherein the hardware processor reads and executes the program stored in the storage device to:

perform a control process so that third output power of an AC control waveform generated by adding the first output power to the second output power is supplied to a load.

Although modes for carrying out the present invention have been described above using embodiments, the present invention is not limited to the embodiments and various modifications and substitutions can be made without departing from the scope and spirit of the present invention.

What is claimed is:

1. A power conversion device comprising:
a first converter configured to convert at least first battery power output by a first battery into first output power of a first voltage waveform based on an output waveform profile that has been input or set and output the first output power; and
a first generator configured to generate and output second output power based on the first battery power,
wherein third output power of an alternating current (AC) control waveform generated by adding the first output power to the second output power is supplied to a load
wherein
a voltage waveform of the second output power is a rectangular waveform, the first voltage waveform is a voltage waveform obtained by subtracting the rectangular waveform from the control waveform,
the first generator includes
a switching unit configured to generate half-waves of sinusoidal waves by controlling a process of adding the first output power to the second output power; and
an inversion unit configured to supply the third output power obtained by inverting the half-waves to the load.

2. The power conversion device according to claim 1, wherein the switching unit is a first switching element configured to be set in a conductive state in which the second output power is able to be supplied to the load and to be set in a non-conductive state in which the first output power is unable to be supplied from the first converter to the first generator.

3. The power conversion device according to claim 2, further comprising a second generator connected in parallel to the first converter and configured to generate and output fourth output power of a rectangular waveform based on the first battery power,
wherein the switching unit further includes a second switching element configured to be set in a conductive state in which the fourth output power is able to be supplied to the load and to be set in a non-conductive state in which the first output power is unable to be supplied from the first converter to the second generator, and
wherein the third output power generated by adding the first output power and the second output power to the fourth output power is supplied to the load.

4. The power conversion device according to claim 1, wherein the switching unit is a third switching element configured to switch a connection between the first generator and the first converter to a series connection or a parallel connection.

5. The power conversion device according to claim 4, further comprising a third generator configured to generate and output fifth output power of a rectangular waveform based on second battery power output by a second battery, wherein the switching unit further includes a fourth switching element configured to switch a connection between a series connection between the first generator, and the first converter and the third generator to a series connection or a parallel connection, and wherein the third output power generated by adding the first output power and the second output power to the fifth output power is supplied to the load.

6. The power conversion device according to claim 1, wherein the switching unit includes:

a fifth switching element configured to be set in a conductive state in which the first output power is able to be supplied to the load and to be set in a non-conductive state in which the second output power is unable to be supplied to the first converter; and a sixth switching element configured to cause the first generator and the first converter to be connected or disconnected.

7. The power conversion device according to claim 6, further comprising a fourth generator connected in parallel to the first converter and the first generator and configured to generate and output sixth output power based on the first battery power, wherein the switching unit further includes a seventh switching element configured to be set in a conductive state in which the sixth output power is able to be supplied to the load and to be set in a non-conductive state in which the first output power and the second output power are unable to be supplied to the fourth generator, and wherein the third output power generated by adding the first output power and the second output power to the sixth output power is supplied to the load.

8. A method of controlling a power conversion device including a first converter configured to convert at least first battery power output by a first battery into first output power of a first voltage waveform based on an output waveform profile that has been input or set and output the first output power and a first generator configured to generate and output second output power based on the first battery power, the method comprising:

performing, by a computer, a control process so that third output power of an alternating current (AC) control waveform generated by adding the first output power to the second output power is supplied to a load, wherein a voltage waveform of the second output power is a rectangular waveform, the first voltage waveform is a voltage waveform obtained by subtracting the rectangular waveform from the control waveform, the first generator includes a switching unit configured to generate half-waves of sinusoidal waves by controlling a process of adding the first output power to the second output power; and an inversion unit configured to supply the third output power obtained by inverting the half-waves to the load.

9. A non-transitory computer-readable storage medium storing a program for controlling a power conversion device including a first converter configured to convert at least first battery power output by a first battery into first output power of a first voltage waveform based on an output waveform profile that has been input or set and output the first output power and a first generator configured to generate and output second output power based on the first battery power, the program causing a computer to:

perform a control process so that third output power of an alternating current (AC) control waveform generated by adding the first output power to the second output power is supplied to a load, wherein a voltage waveform of the second output power is a rectangular waveform, the first voltage waveform is a voltage waveform obtained by subtracting the rectangular waveform from the control waveform, the first generator includes a switching unit configured to generate half-waves of sinusoidal waves by controlling a process of adding the first output power to the second output power; and an inversion unit configured to supply the third output power obtained by inverting the half-waves to the load.

* * * * *